(12) United States Patent
Mizuuchi et al.

(10) Patent No.: US 8,228,461 B2
(45) Date of Patent: Jul. 24, 2012

(54) LIQUID CRYSTAL DISPLAY DEVICE

(75) Inventors: Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 12/446,530

(22) PCT Filed: Nov. 2, 2007

(86) PCT No.: PCT/JP2007/071365
§ 371 (c)(1),
(2), (4) Date: Apr. 21, 2009

(87) PCT Pub. No.: WO2008/056600
PCT Pub. Date: May 15, 2008

(65) Prior Publication Data
US 2010/0315574 A1    Dec. 16, 2010

(30) Foreign Application Priority Data

Nov. 6, 2006 (JP) .................. 2006-299902
Nov. 6, 2006 (JP) .................. 2006-299903

(51) Int. Cl.
*G02F 1/1333* (2006.01)
(52) U.S. Cl. .......................................... 349/62
(58) Field of Classification Search .................. None
See application file for complete search history.

(56) References Cited

U.S. PATENT DOCUMENTS

| | | | |
|---|---|---|---|
| 5,805,117 A | 9/1998 | Mazurek et al. | |
| 6,377,324 B1* | 4/2002 | Katsura | 349/58 |
| 7,165,865 B2* | 1/2007 | Cho | 362/253 |
| 7,924,361 B2* | 4/2011 | Kim | 349/58 |
| 2004/0182960 A1* | 9/2004 | Hach | 241/301 |
| 2006/0007706 A1* | 1/2006 | Chen et al. | 362/614 |
| 2008/0180453 A1* | 7/2008 | Fergason et al. | 345/581 |
| 2009/0322985 A1* | 12/2009 | Mizuuchi | 349/62 |

FOREIGN PATENT DOCUMENTS

| | | |
|---|---|---|
| JP | 6-347785 | 12/1994 |
| JP | 9-500461 | 1/1997 |
| JP | 11-167808 | 6/1999 |
| JP | 2002-6311 | 1/2002 |
| JP | 2004-226709 | 8/2004 |
| JP | 2004-342405 | 12/2004 |
| JP | 2006-134661 | 5/2006 |
| JP | 2006-134720 | 5/2006 |

OTHER PUBLICATIONS

International Search Report issued Dec. 25, 2007 in the International (PCT) Application No. PCT/JP2007/071365.

* cited by examiner

*Primary Examiner* — Tina Wong
(74) *Attorney, Agent, or Firm* — Wenderoth, Lind & Ponack, L.L.P.

(57) ABSTRACT

A compact liquid crystal display device is provided by connecting a plurality of liquid crystal display panel units each provided with a light guiding plate unit on a back side with a connection portion and supplying a laser light source via the connection portion. The compact liquid crystal display device includes a plurality of display portions formed of liquid crystal display panel units and light guiding plate units disposed in intimate contact with the back sides of the liquid crystal display panel units, a connection portion connecting a plurality of the display portions, and a laser light source. By supplying a laser beam emitted from the laser light source to the light guiding plate units via the connection portion, the display surfaces of the liquid crystal display panel units are illuminated by the laser beam.

20 Claims, 31 Drawing Sheets

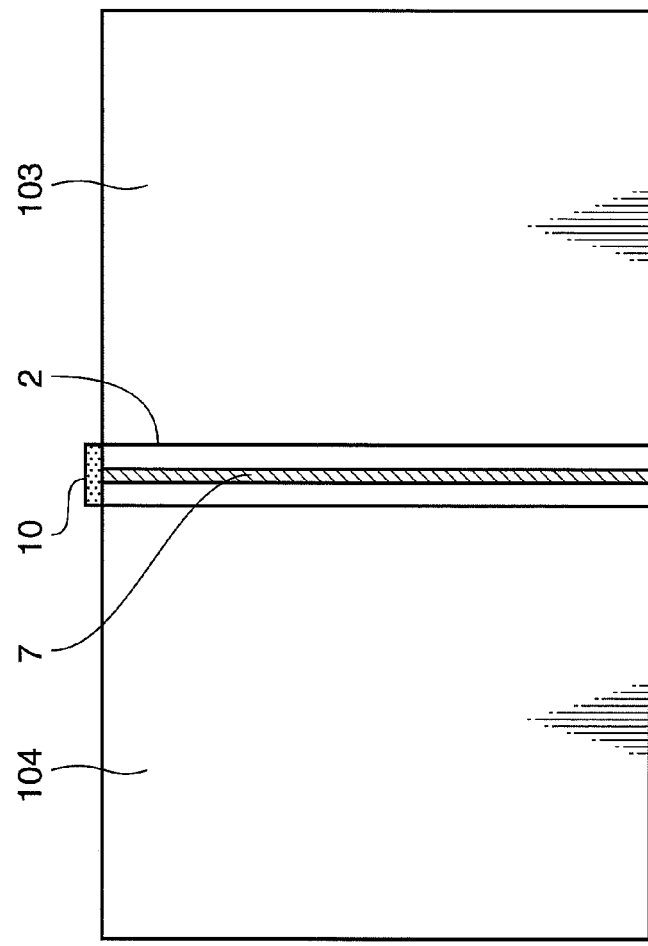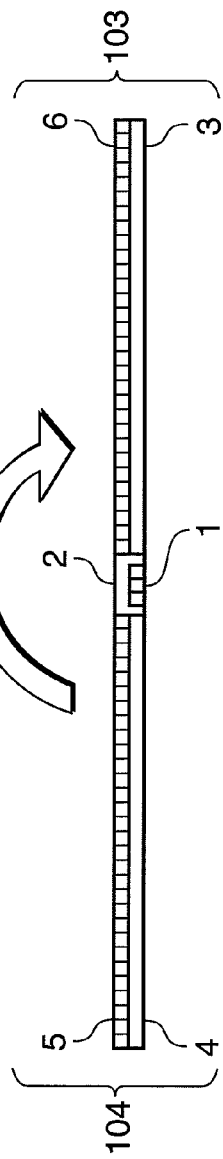
FIG.2A
FIG.2B

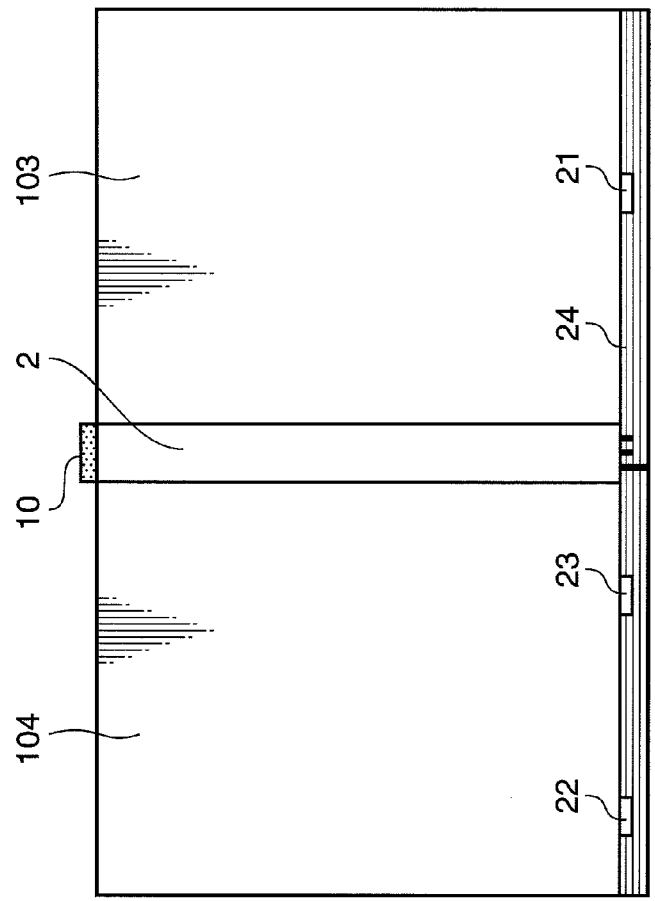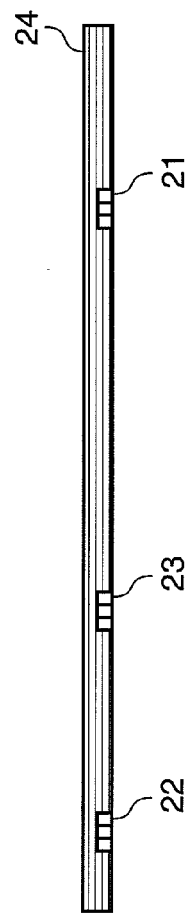
FIG.4A
FIG.4B

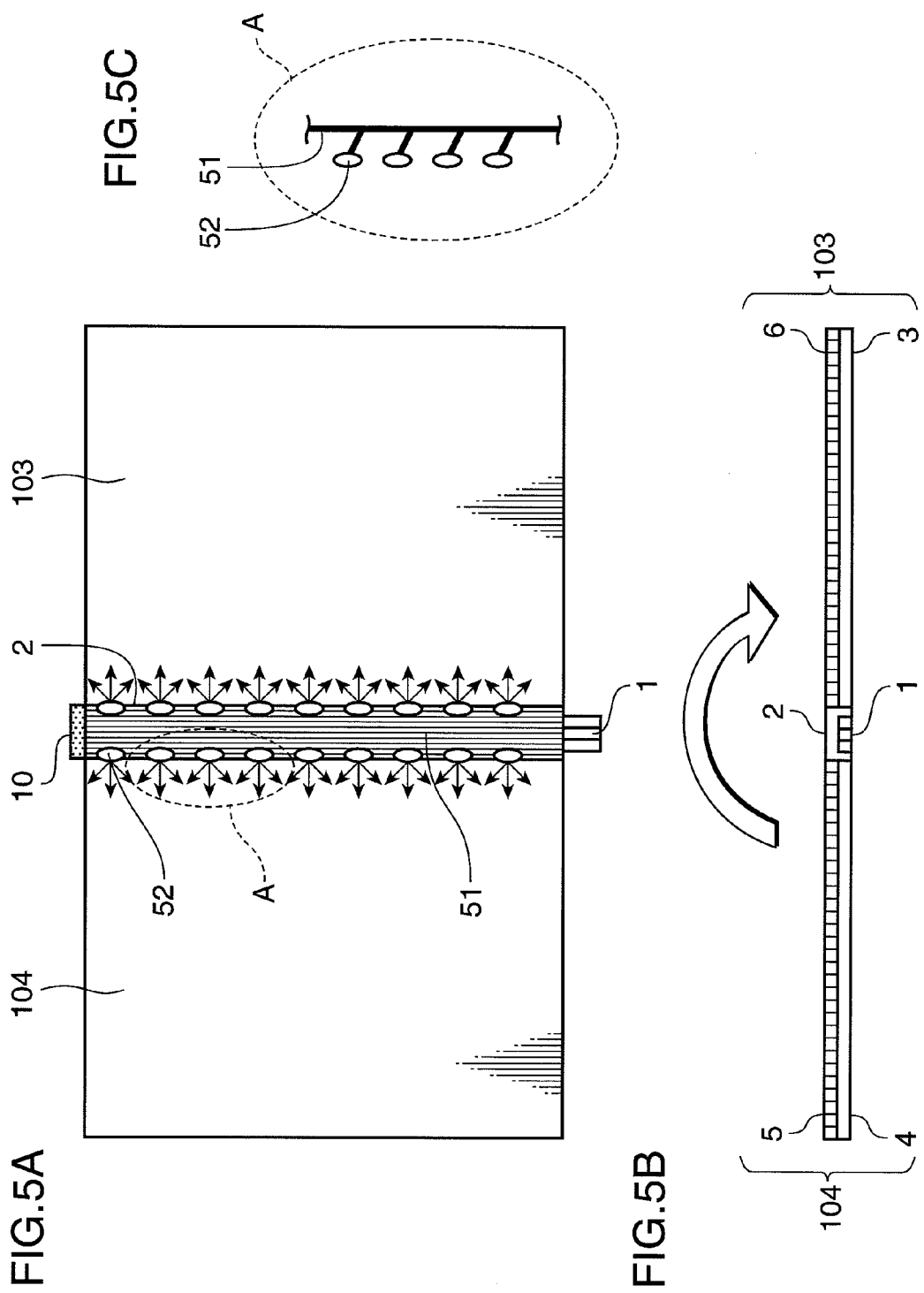

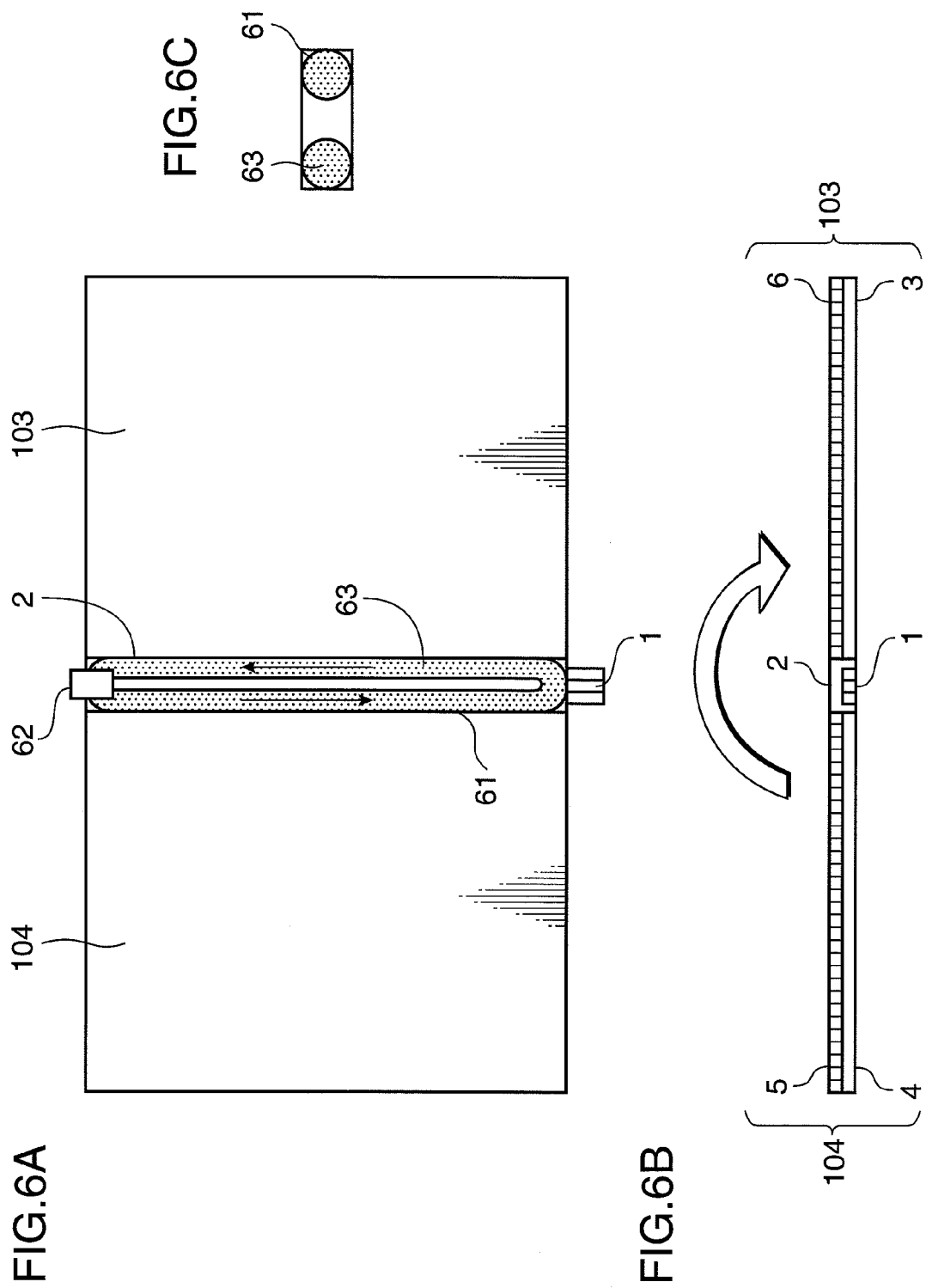

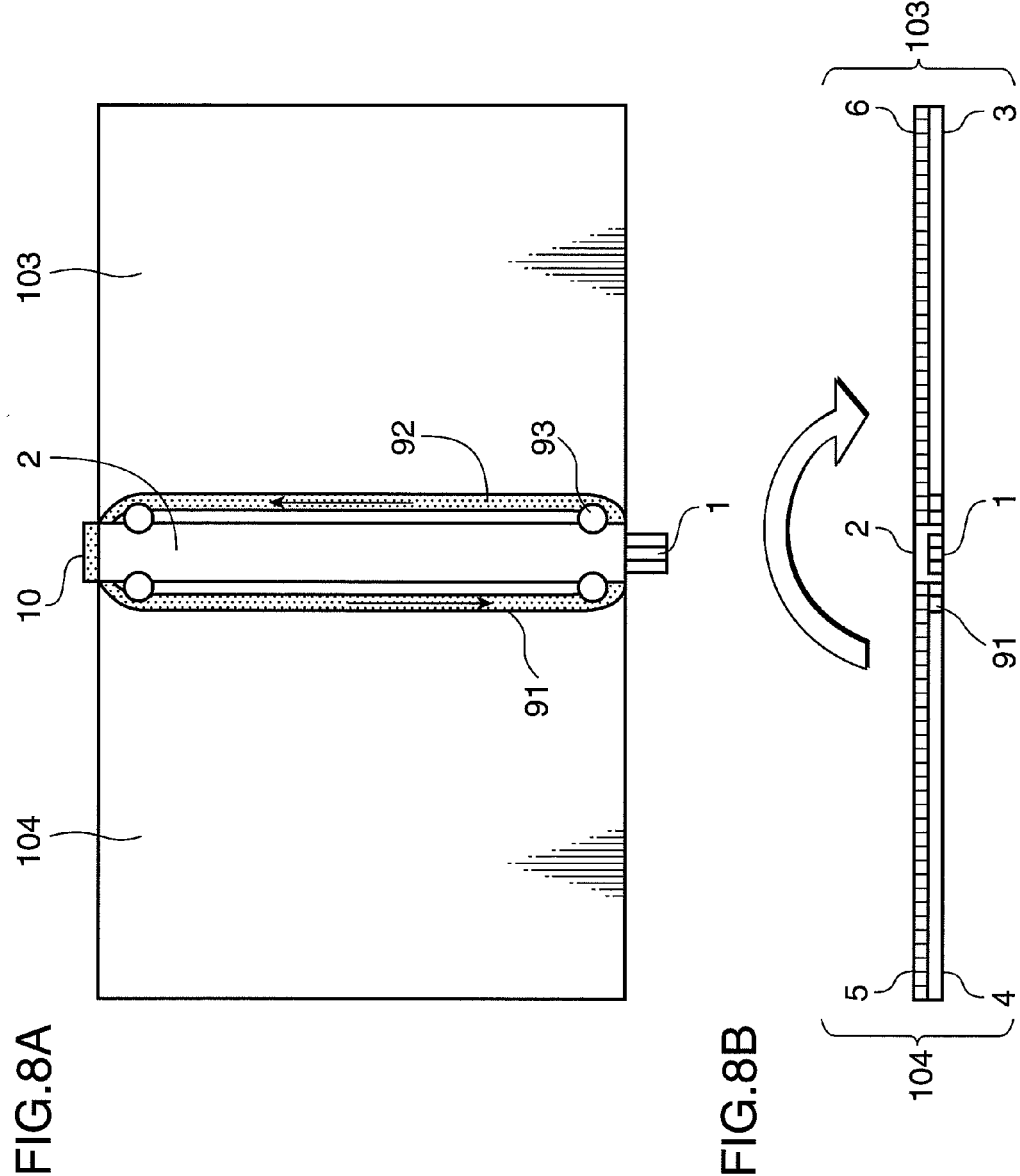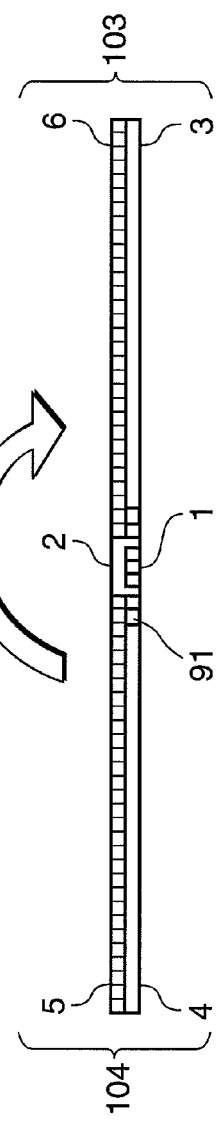
FIG.8A
FIG.8B

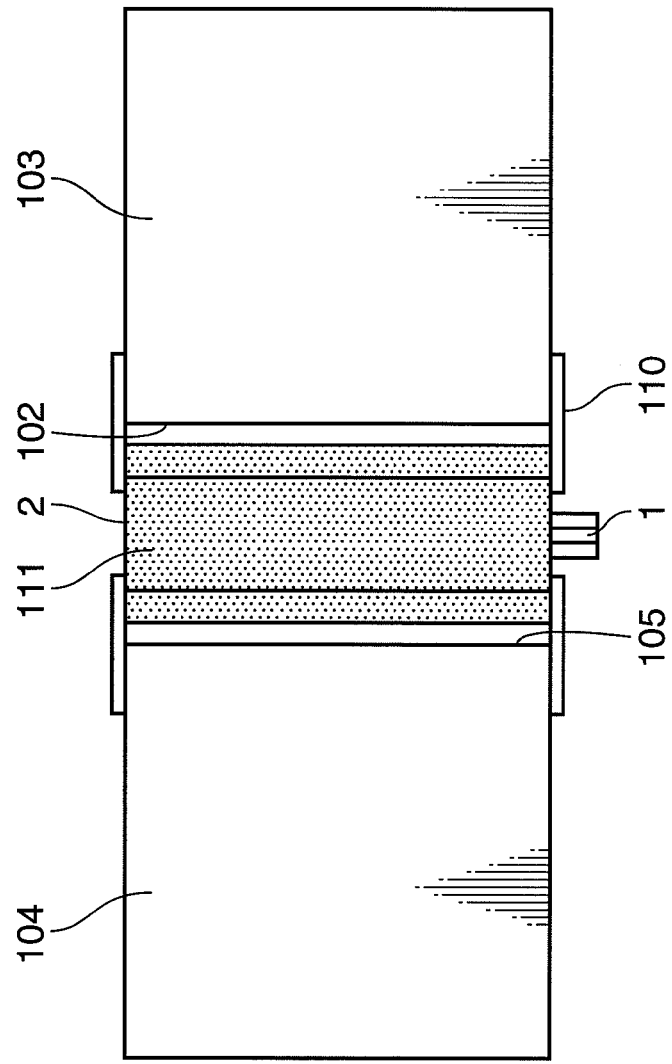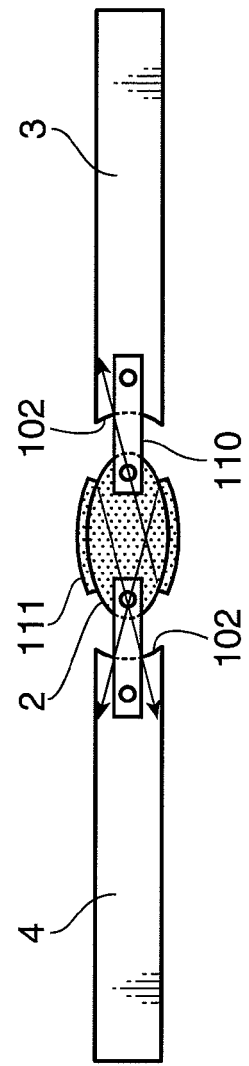
FIG.11A
FIG.11B

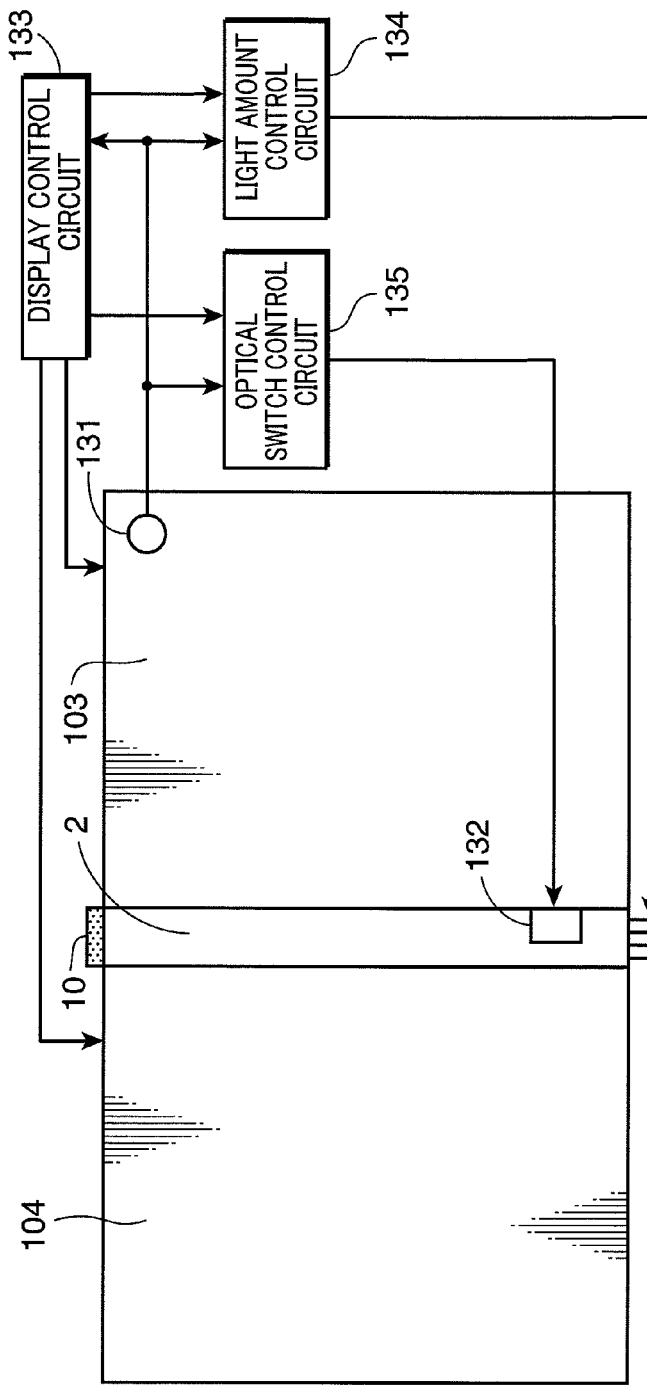
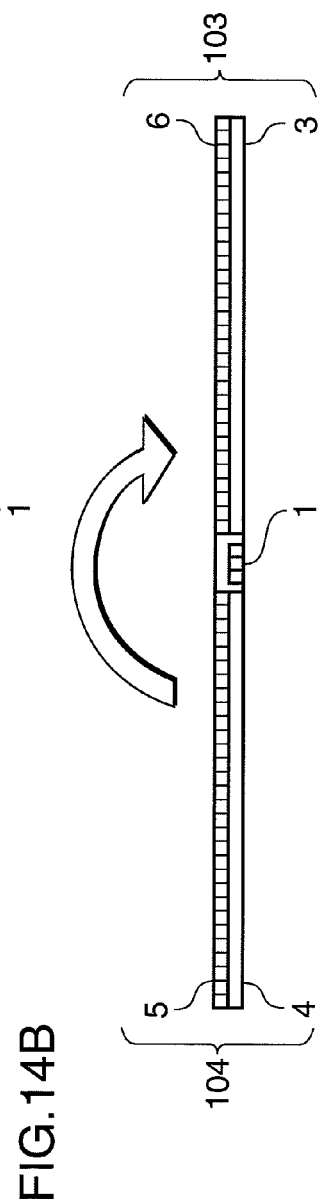
FIG.14A
FIG.14B

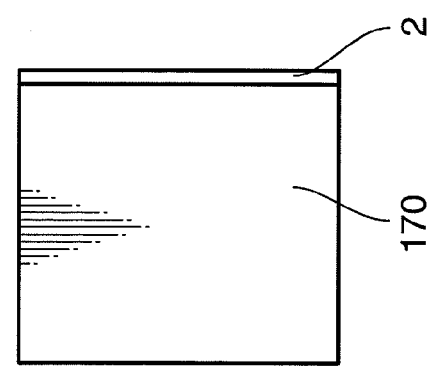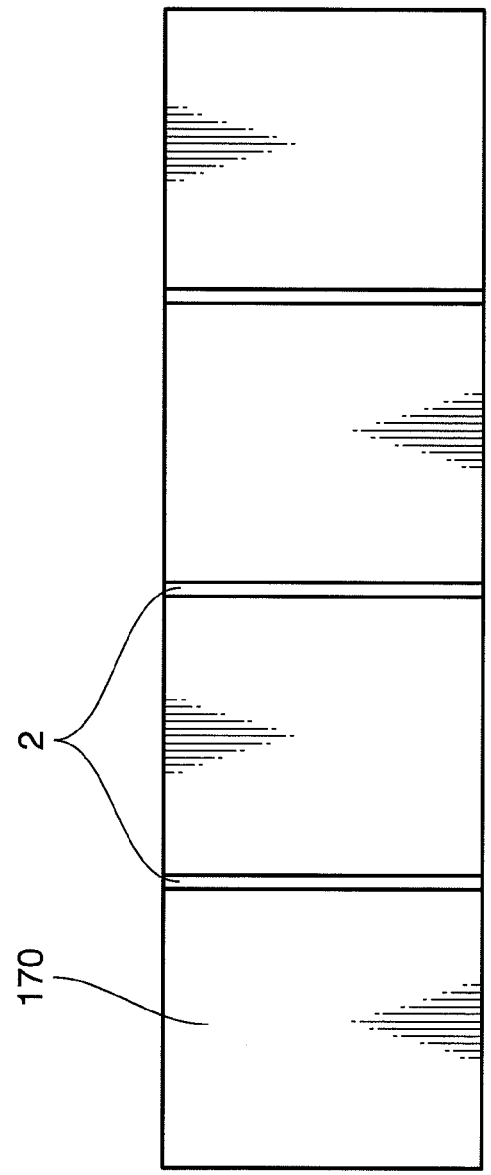
FIG.18A
FIG.18B

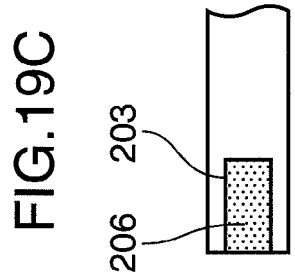
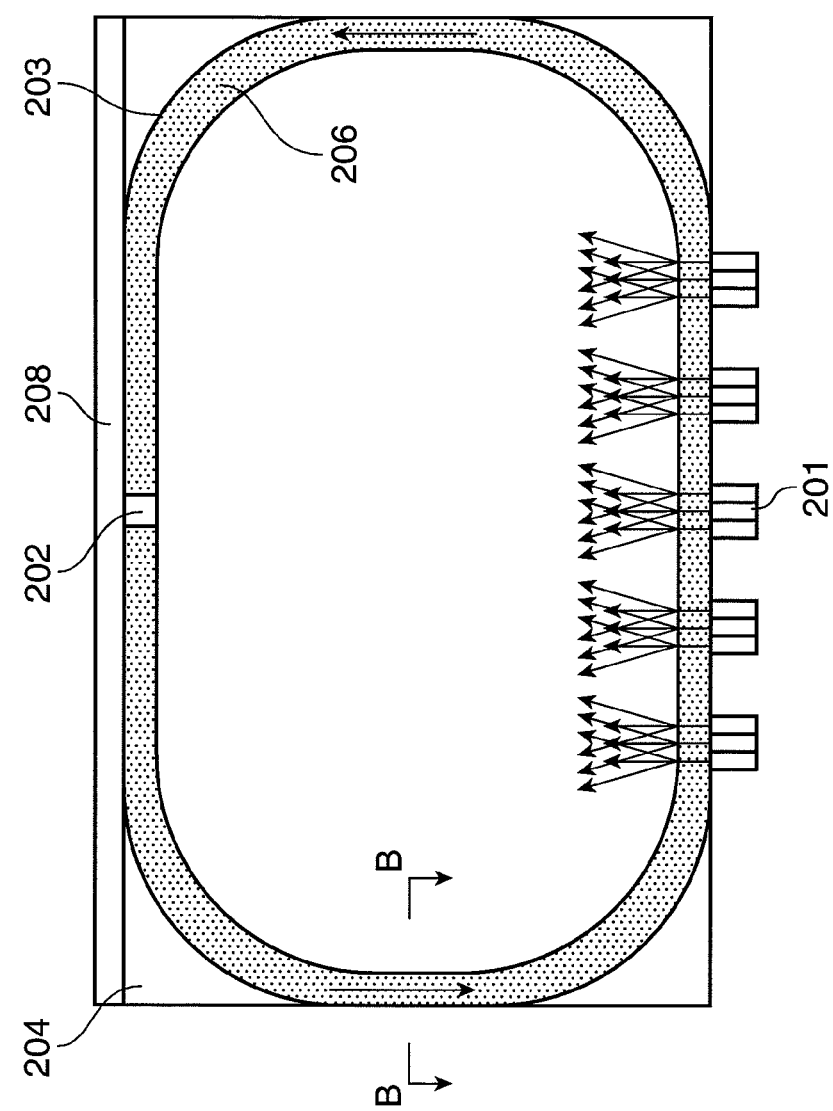
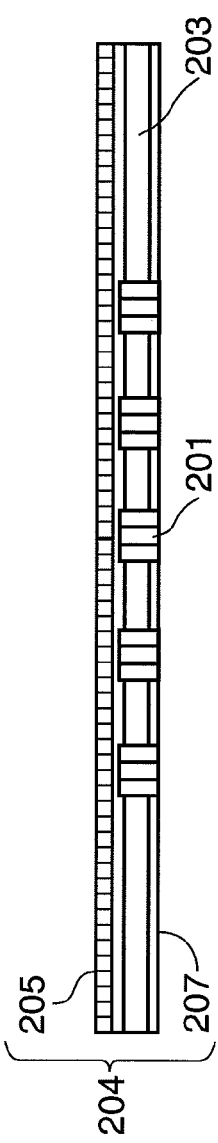

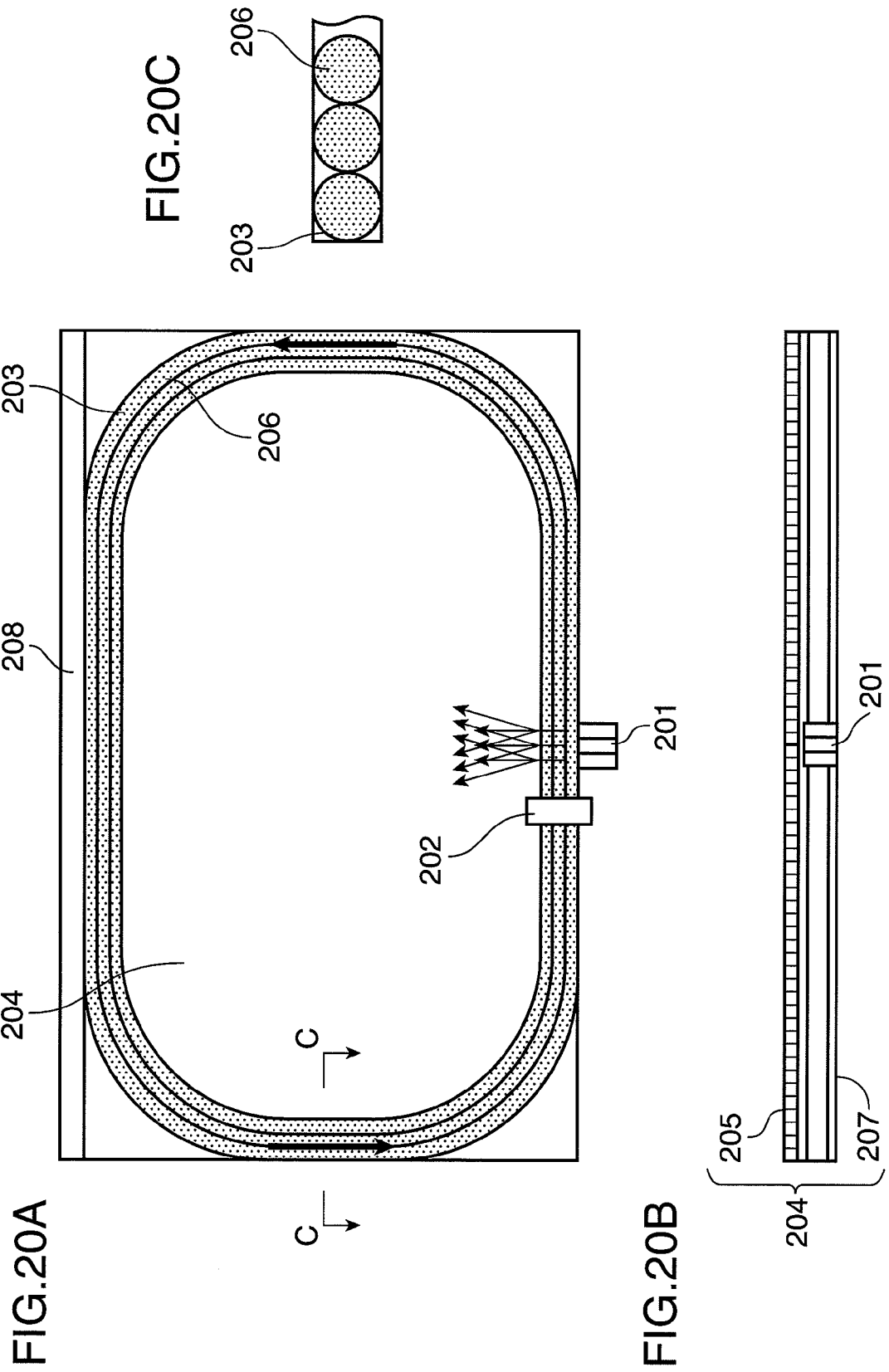

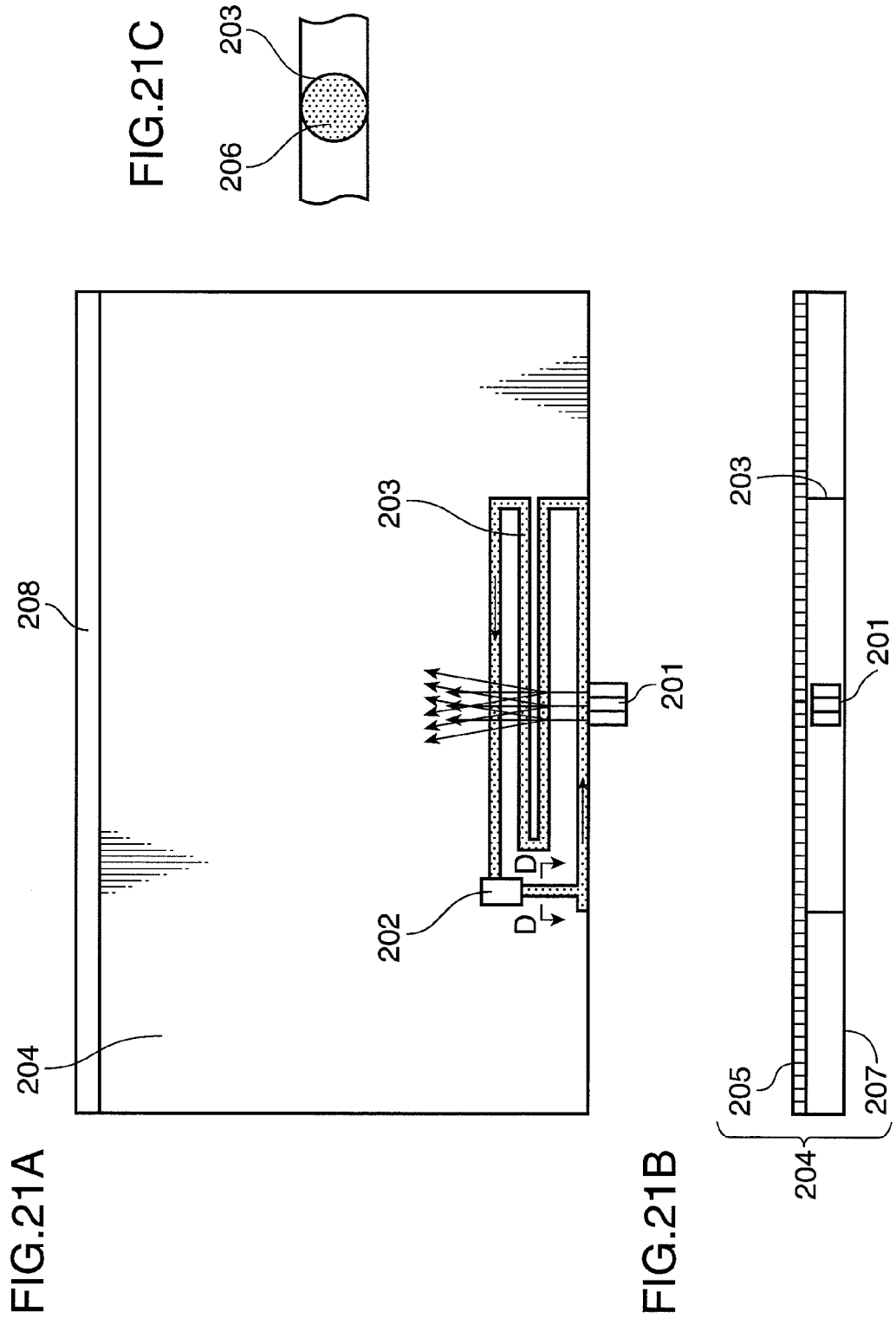

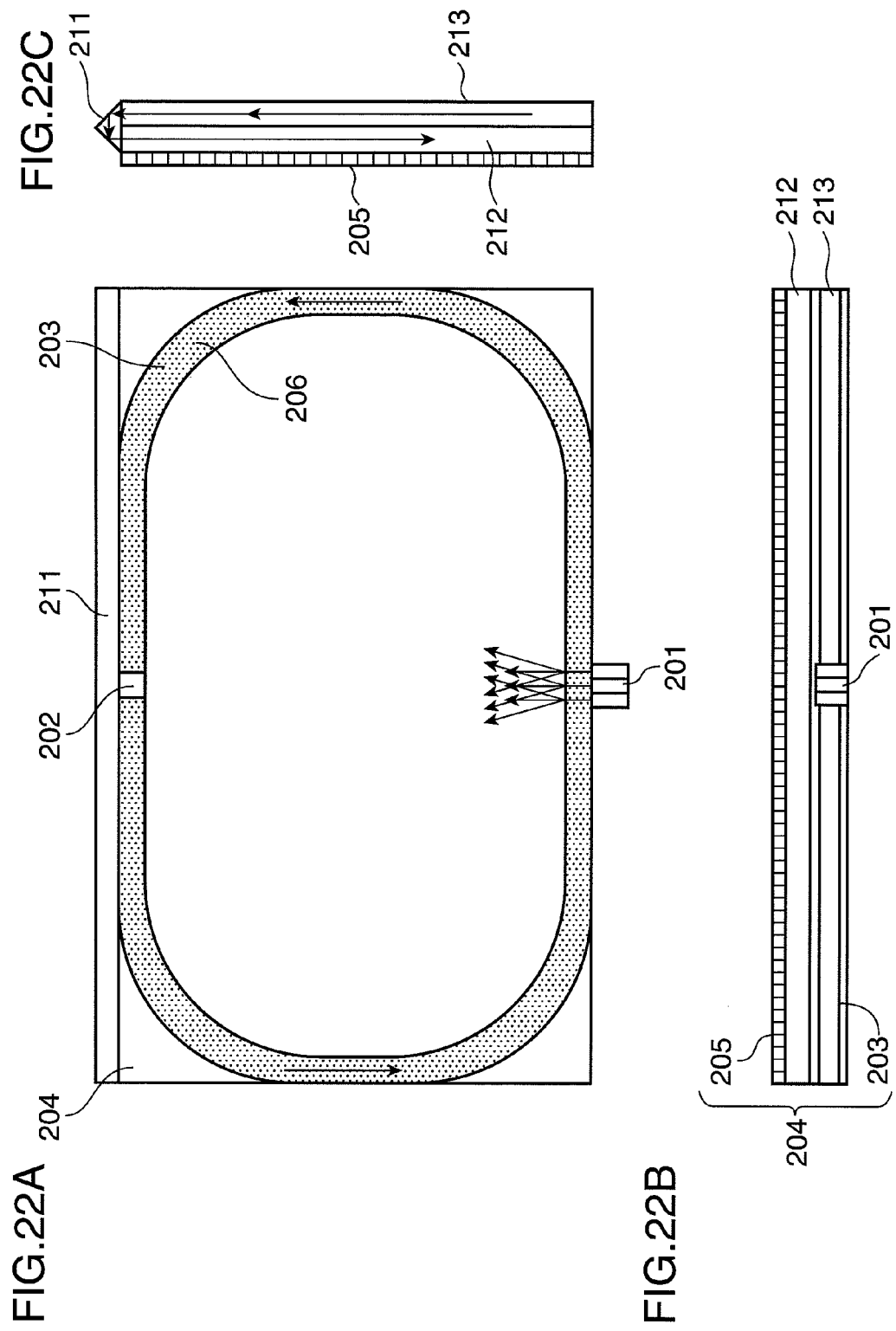

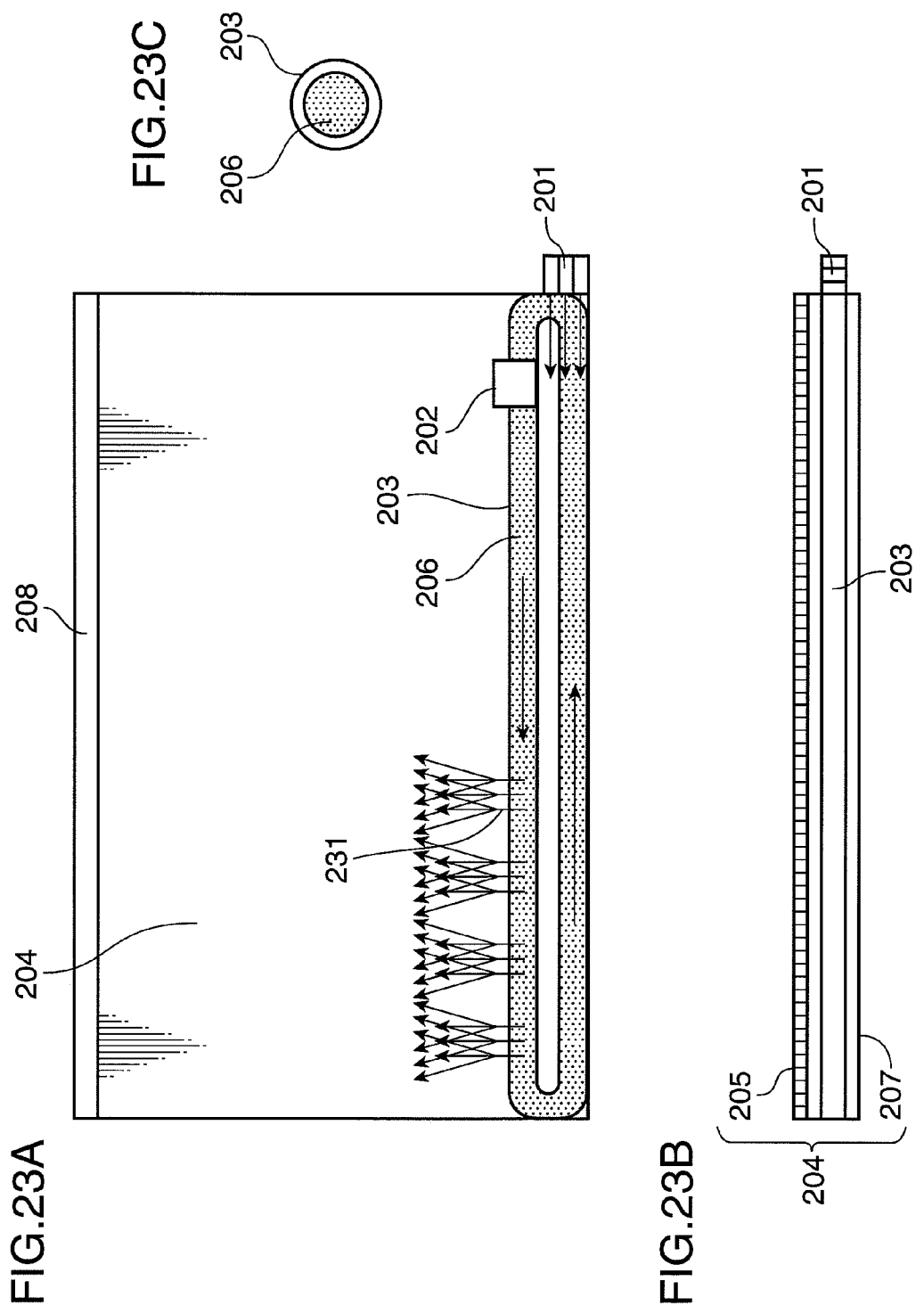

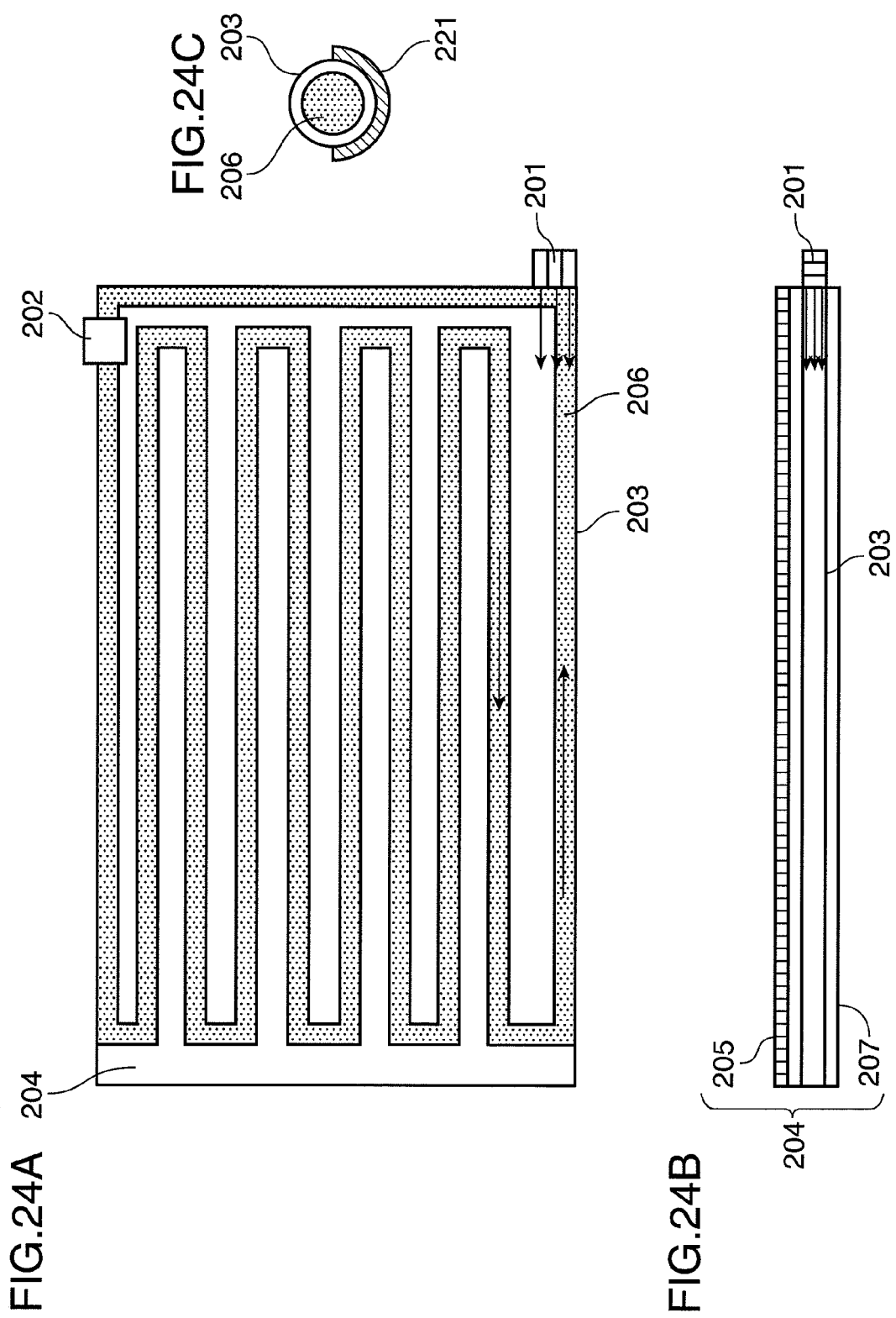

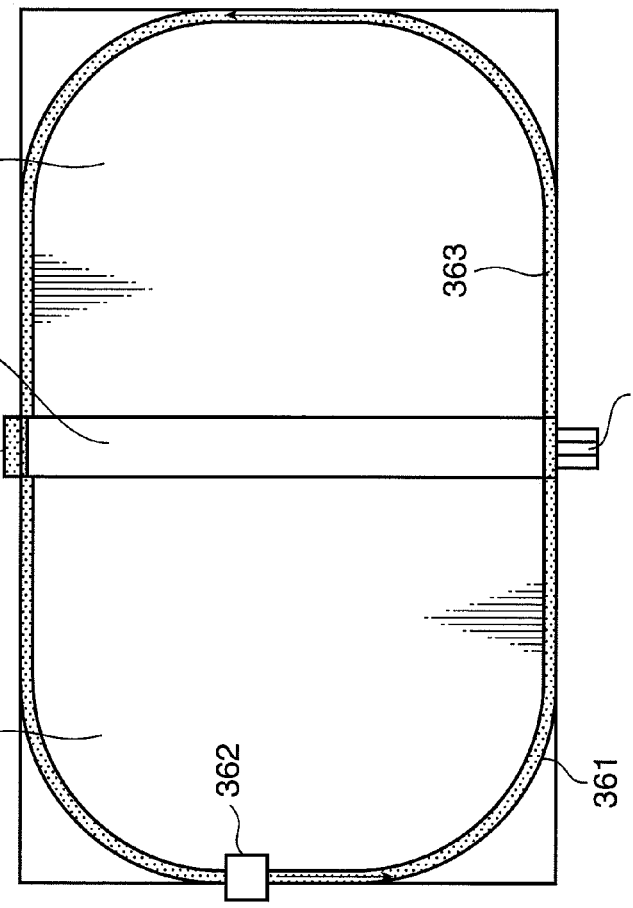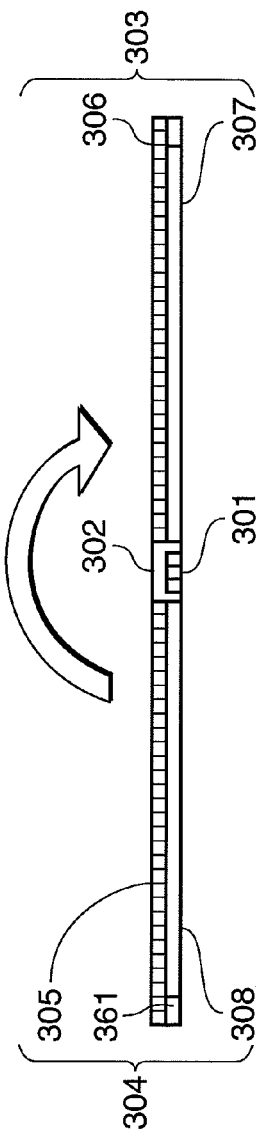
FIG.26A
FIG.26B

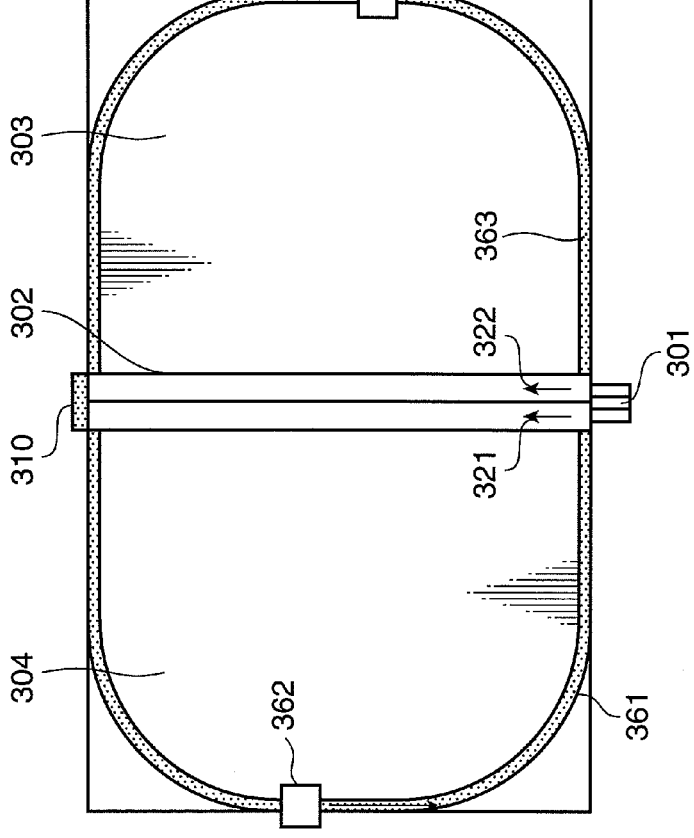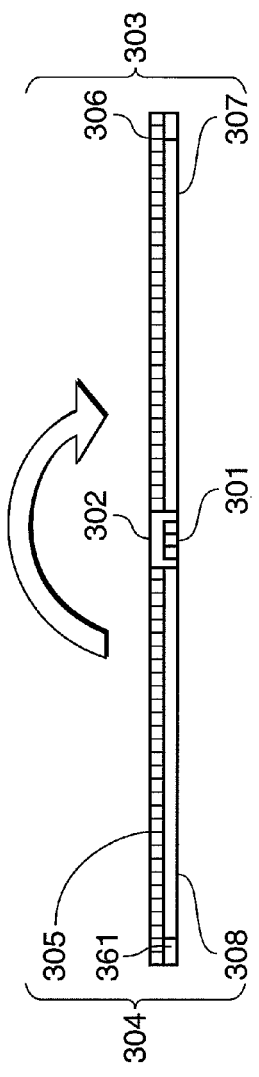
FIG.27A
FIG.27B

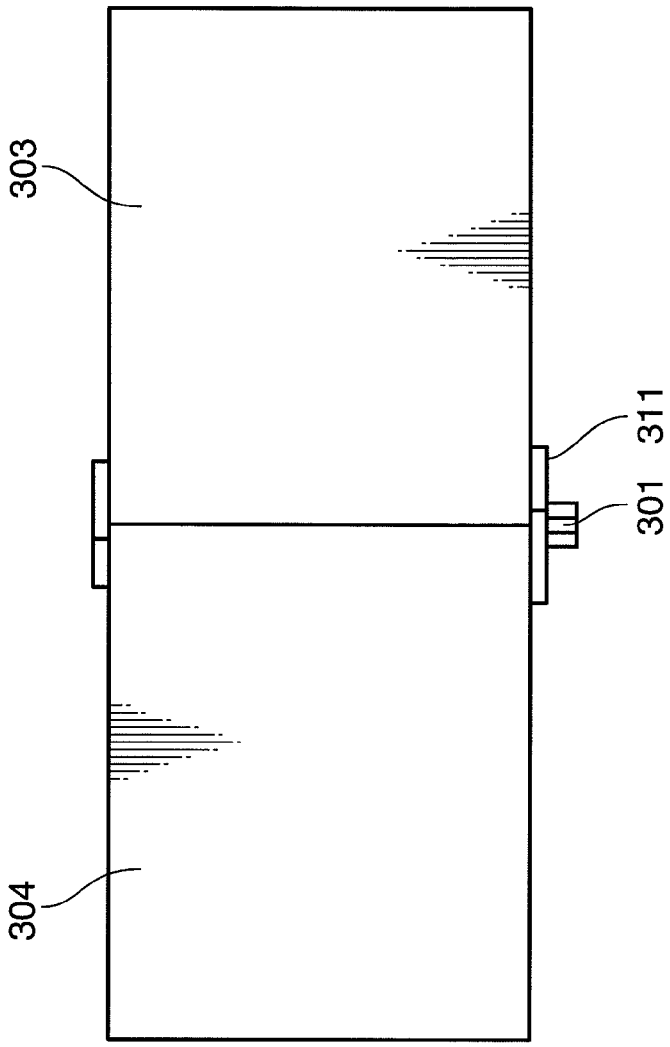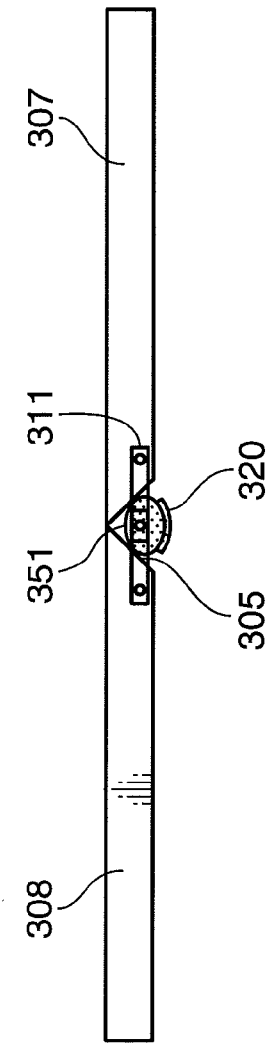
FIG.30A
FIG.30B

LIQUID CRYSTAL DISPLAY DEVICE

TECHNICAL FIELD

The present invention relates to a compact liquid crystal display device that supplies a laser beam from a laser light source to a plurality of display panels.

BACKGROUND ART

A liquid crystal display device (hereinafter, abbreviated as LCD) is widely used as a compact portable display, such as a display device for personal computer. Such a portable liquid crystal display device is described, for example, in Patent Document 1. Patent Document 1 describes a display device including a first liquid crystal display portion having a first liquid crystal panel and a first case, a second liquid crystal display portion having a second liquid crystal panel and a second case, and a hinge supporting the first case and the second case pivotally. Patent Document 1 further describes a display device configured in such a manner that light from the light source disposed at the hinge portion is supplied to two openable and closable liquid crystal display portions connected to each other by the hinge portion.

Cold cathode fluorescent tubes are often used as the light source of such a liquid crystal display device. The cold cathode fluorescent tube method, however, has problems, such as the optical system including the light source becomes larger and the display performance of the liquid crystal display device is deteriorated by heat generated in the cold cathode fluorescent tube.

Further, in association with an increasing demand as a TV receiver in recent years, there has been a need for the LCD to have a further higher image quality. To this end, using light emitting diodes (hereinafter, abbreviated as LEDs) as the light source is now being discussed.

In order to avoid influences of heat generation, there is a liquid crystal display device (see, for example, Patent Document 2) configured to be illuminated by a backlight formed of a light source having, for example, a cold cathode fluorescent tube, a first light guiding body forming a planar light source and having a wedge-shaped cross section, a second light guiding body disposed at an end face portion of the first light guiding body to supply illumination light to the first light guiding body, and an optical fiber connecting the light source and the second light guiding body. Noises caused by influences of heat generation in the cold cathode fluorescent tube and application of a high frequency voltage are prevented by a configuration different from the conventional configuration, that is, by connecting the cold cathode fluorescent tube and the first light guiding body with the optical fiber as described above.

Also, there is a planar light source device using a light guiding plate having a wedge-shaped cross section, so that a reduction in size and in weight of the device can be achieved by decreasing an invalid region within the light guiding plate even when a point light source like LEDs are used (see, for example, Patent Document 3). Such a planar light source device using LEDs has satisfactory color reproducibility and is capable of obtaining a high image quality in comparison with those using cold cathode fluorescent tubes.

Further, as a planar light source device capable of making luminance across a light emitting surface homogeneous by using fewer LEDs, there is a structure in which a single optical waveguide connected to LEDs is wound and disposed on the back side of the light guiding plate (see, for example, Patent Document 4).

Also, a planar light source device achieving a higher image quality using not only LEDs for red (R) light, blue (B) light, and green (G) light, but also LEDs emitting light of other colors is now in practical use. Further, a planar light source device in which a part of LEDs are replaced with a semiconductor laser device is being discussed. This is because the semiconductor laser device has high luminance and a high output in comparison with LEDs and is therefore capable of reducing drive power and upgrading the image quality.

Meanwhile, various configurations have been developed for a multi-panel LCD forming a large screen or a multi-screen by aligning a large number of liquid crystal panels planar-wise and are now in practical use. For example, there is a multi-panel LCD having a plurality of liquid crystal display panel units disposed tile-wise and using a planar light source device formed of linearly aligned fluorescent lamps on the back side and across a plurality of the liquid crystal display panel units (see, for example, Patent Document 5).

Patent Document 1, however, fails to disclose or suggest the use of a laser as the light source. Accordingly, neither is it possible to achieve a thin-film device and space saving that can be realized by a laser capable of achieving higher luminance, nor to achieve a longer life of the battery owing to low power consumption. In addition, the configuration described in Patent Document 1 requires a light source to illuminate liquid crystal panels for each of the first liquid crystal display portion and the second liquid crystal display portion. The need for a plurality of light sources accompanied with a plurality of optical systems increases the cost and requires a further larger space.

According to the configuration described in Patent Document 2, a fluorescent tube is provided to the hinge portion connecting the liquid crystal panels. This configuration, however, has a problem that an increase in volume of the hinge portion and an increase in thickness of the liquid crystal display device itself are unavoidable with an increase of the optical system including fluorescent tubes in size.

Patent Document 3 includes a light source formed to be installed separately from the liquid crystal display device. However, it neither discloses nor suggests the configuration to reduce the size by using a plurality of liquid crystal display panels. Patent Document 4 describes the configuration used in a liquid crystal display device by realizing a homogeneous and high-luminance planar light source device using LEDs. However, it also fails to disclose or suggest the configuration to make a size compact enough to be portable using a plurality of liquid crystal display panels.

On the contrary, Patent Document 5 describes a liquid crystal display device with a large screen by combining a plurality of liquid crystal display panels into a unit. In this example, the planar light source device is formed by aligning fluorescent tubes linearly on the back side of the liquid crystal display panel units and across the liquid crystal display panel units. Accordingly, the length of the fluorescent tubes imposes a limit on the size of a large screen, and because a large number of fluorescent tubes are used, the life of the fluorescent tubes often causes irregular luminance and deterioration of luminance of the liquid crystal display device. This method is therefore thought to be difficult to ensure reliability over a long period. In addition, it is impossible to achieve a portable compact display device that requires space saving and low power consumption with this method.

Incidentally, a large screen is achieved using a single liquid crystal display panel for a TV receiver. However, in order to achieve a portable display device, it is desirable that the display device has a compact, thin-film, light, and space saving outer shape and a capability of displaying a large screen at the same time. In order to satisfy these requirements, there is required a configuration by which a display device is compact and space saving when carried along whereas the display area is expandable at the time of liquid crystal display. In order to satisfy this requirement, there is a need for a configuration that makes the liquid crystal panel space saving when carried along, for example, by folding the liquid crystal display panel. At the same time, in order to make the device itself to be compact, light, and thin-film, it is necessary to reduce the size of the optical system by using a high-luminance light source, while a low power consuming light source capable of extending the life of the battery is essential to provide the display device with mobility. For all these requirements, however, luminance of the light source is so low in the conventional configurations using LEDs and fluorescent tubes that it is impossible to achieve a compact and thin-film optical system. In addition, efficiency of fluorescent tubes and LEDs is considerably low at low power consumption including utilization efficiency of the optical system, which makes it difficult to achieve low power consumption in a case where a relatively large screen is displayed. Further, in a case where LEDs and fluorescent tubes are disposed, because light-emitting luminance and the life vary among a large number of LEDs and fluorescent tubes, there arises a problem that it is impossible to fully ensure the reliability as the liquid crystal display device as a whole.

Patent Document 1: JP-A-2002-6311
Patent Document 2: JP-A-11-167808
Patent Document 3: JP-A-2006-134661
Patent Document 4: JP-A-2006-134720
Patent Document 5: JP-A-9-500461

DISCLOSURE OF THE INVENTION

An object of the invention is to provide a compact, light, space saving, and low power consuming liquid crystal display device by supplying a laser light source via a connection portion that connects a plurality of liquid crystal display panel units.

A liquid crystal display device according to one aspect of the invention includes: a plurality of display portions each having a liquid crystal display panel unit having one principal surface on which a laser beam goes incident and the other principal surface opposing the one principal surface and a planar light guiding plate unit disposed on a side of the one principal surface of the liquid crystal display panel unit; a connection portion connected to each of the plurality of display portions so as to dispose the plurality of display portions for images displayed on the plurality of respective display portions to be displayed adjacently; and a laser light source supplying the laser beam to the light guiding plate unit. The laser light source emits the laser beam to the connection portion, and the connection portion supplies the laser beam emitted from the laser light source to the light guiding plate unit in each of the plurality of display portions.

The liquid crystal display device described above is able to supply light from the laser light source to the planar light guiding plate unit efficiently owing to the structure to supply light to a plurality of liquid crystal panels via the connection portion. By supplying a laser beam via the connection portion, the number of laser light sources and optical systems can be reduced, which in turn enables a reduction in size and in cost. Further, by using the laser light source, the luminance of the light source can be increased, which allows light to enter into and exit from fine optical systems and optical components efficiently. It thus becomes possible to reduce the optical systems including the light source and the connection portion in size and make the light guiding plate unit thinner.

BRIEF DESCRIPTION OF THE DRAWINGS

FIG. 1A is a top view and FIG. 1B is a side view.

FIG. 2A and FIG. 2B are schematic views used to describe another configuration of the liquid crystal display device according to the first embodiment of the invention; FIG. 2A is a top view and FIG. 2B is a side view.

FIG. 3A is a top view and FIG. 3B is a side view.

FIG. 4A and FIG. 4B are schematic views used to describe the configuration of the liquid crystal display device according to the first embodiment of the invention; FIG. 4A is a top view and FIG. 4B is a side view.

FIG. 5A through FIG. 5C are schematic views used to describe the configuration of the liquid crystal display device according to the first embodiment of the invention; FIG. 5A is a top view, FIG. 5B is a side view, and FIG. 5C is an enlarged view of an optical interconnection in a portion A.

FIG. 6A through FIG. 6C are schematic views used to describe the configuration of a liquid crystal display device according to a second embodiment of the invention; FIG. 6A is a top view, FIG. 6B is a side view, and FIG. 6C is a cross section of a connection portion.

FIG. 7A is a top view and FIG. 7B is a side view.

FIG. 8A and FIG. 8B are schematic views used to describe still another configuration of the liquid crystal display device of the second embodiment of the invention; FIG. 8A is a top view and FIG. 8B is a side view.

FIG. 9A is a top view and FIG. 9B is a side view.

FIG. 10A and FIG. 10C are side views before a liquid crystal display panel unit is slid (when accommodated) and FIG. 10B and FIG. 10D are side views after the liquid crystal display panel unit is slid (when expanded).

FIG. 11A and FIG. 11B show an example of the configuration of a connection portion furnished with a hinge capability; FIG. 11A is a top view and FIG. 11B is a side view.

FIG. 12A is a top view and FIG. 12B is a side view.

FIG. 13A is a top view and FIG. 13B and FIG. 13C are side views.

FIG. 14A and FIG. 14B are schematic views used to schematically describe the configuration of a liquid crystal display device according to a fourth embodiment of the invention; FIG. 14A is a top view and FIG. 14B is a side view.

FIG. 18A and FIG. 18B are schematic views used to describe another configuration to connect a plurality of display portions to one connection portion.

FIG. 19A through FIG. 19C are schematic views used to describe the configuration of a liquid crystal display device using a planar light source according to a fifth embodiment of the invention; FIG. 19A is a top view, FIG. 19B is a side view, and FIG. 19C is a cross section taken on line B-B of FIG. 19A.

FIG. 20A through FIG. 20C are schematic views used to describe another configuration of the liquid crystal display device using the planar light source according to the fifth embodiment of the invention; FIG. 20A is a top view, FIG. 20B is a side view, and FIG. 20C is a cross section taken on line C-C of FIG. 20A.

FIG. 21A through FIG. 21C are schematic views used to describe still another configuration of the liquid crystal display device using the planar light source according to the fifth embodiment of the invention; FIG. 21A is a top view, FIG. 21B is a side view, and FIG. 21C is a cross section taken on line D-D of FIG. 21A.

FIG. 22A through FIG. 22C are schematic views used to describe still another configuration of the liquid crystal display device using the planar light source according to the fifth embodiment of the invention; FIG. 22A is a top view, FIG. 22B and FIG. 22C are side views.

FIG. 23A through FIG. 23C are schematic views used to describe the configuration of the liquid crystal display device using a planar light source according to a sixth embodiment of the invention; FIG. 23A is a top view, FIG. 23B is a side view, and FIG. 23C is a cross section of a hollow tube.

FIG. 24A through FIG. 24C are schematic views used to describe another configuration of the liquid crystal display device using the planar light source according to the sixth embodiment of the invention; FIG. 24A is a top view, FIG. 24B is a side view, and FIG. 24C is a cross section of a hollow tube.

FIG. 25A is a side view and FIG. 25B is a cross section.

FIG. 26A and FIG. 26B are schematic views used to describe the configuration of a liquid crystal display device according to a seventh embodiment of the invention; FIG. 26A is a top view and FIG. 26B is a side view.

FIG. 27A and FIG. 27B are schematic views used to describe still another configuration of the liquid crystal display device according to the seventh embodiment of the invention; FIG. 27A is a top view and FIG. 27B is a side view.

FIG. 28A is a top view and FIG. 28B is a side view.

FIG. 29A is a top view and FIG. 29B and FIG. 29C are side views.

FIG. 30A and FIG. 30B are schematic views used to describe still another configuration of the liquid crystal display device according to the seventh embodiment of the invention; FIG. 30A is a top view and FIG. 30B is a side view.

FIG. 31A is a side view before a liquid crystal display panel unit is slid (when accommodated) and FIG. 31B is a side view after the liquid crystal display panel unit is slid (when expanded).

BEST MODE FOR CARRYING OUT THE INVENTION

Figure 1A:
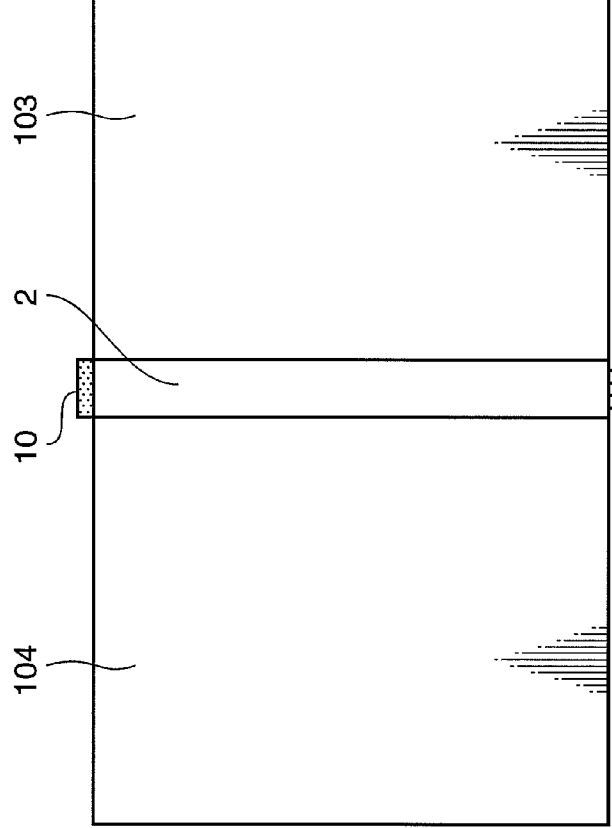
FIG. 1A and FIG. 1B are schematic views used to describe the configuration of a liquid crystal display device according to a first embodiment of the invention.

Hereinafter, embodiments of the invention will be described with reference to the drawings. Like components are labeled with like reference numerals and descriptions are omitted where appropriate.

First Embodiment

Figure 1B:
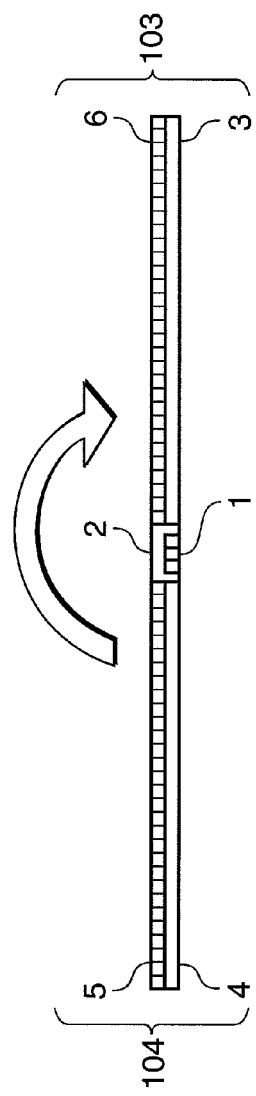

FIG. 1A and FIG. 1B are schematic views used to describe the configuration of a liquid crystal display device according to one embodiment of the invention. FIG. 1A is a top view and FIG. 1B is a side view.

As are shown in FIG. 1A and FIG. 1B, the liquid crystal display device of this embodiment is configured in such a manner that a first display portion 103 and a second display portion 104 are connected by a connection portion 2 and a laser beam is supplied from a laser light source 1 connected to the connection portion 2. As is shown in FIG. 1B, the first display portion 103 is formed of a first liquid crystal panel unit 6 and a first light guiding plate unit 3 disposed in contact with the back side of the first liquid crystal panel unit 6, while the second display portion 104 is formed of a second liquid crystal panel unit 5 and a second light guiding plate unit 4 disposed in contact with the back side of the second liquid crystal panel unit 5. A laser beam is supplied to the first and second light guiding plate units 3 and 4 via the connection portion 2. The laser beam passing through the first and second light guiding plate units 3 and 4 serves as a planar light source and illuminates the first and second liquid crystal panel units 5 and 6.

The laser light source 1 is formed of red (R), green (G), and blue (B) laser light sources. The red laser light source is a semiconductor laser having a wavelength of about 640 nm. The blue laser light source is a GaN semiconductor laser having a wavelength of about 450 nm, which is a multi-mode semiconductor laser having an output of about 1 W and a strip width of about 100 μm. The green laser light source is formed of a solid-state laser pumped by a semiconductor laser and a wavelength conversion element and emits green light having a wavelength of 532 nm. A light-emitting area of the laser light source 1 is of the order of several μm in thickness and 100 μm in width. Hence, the connection portion 2 coupled to a laser beam emitted from the laser light source 1 without any loss needs to be of a size having a width of 1 mm or less and a thickness of about 10 μm. Because a laser beam from the laser light source 1 has an extremely small light-emitting area and therefore has high luminance, the shape of the connection portion 2 can be made extremely small. Further, the first and second light guiding plate units 3 and 4 to which a laser beam is supplied via the connection portion 2 can be achieved by a thin film as thin as about 0.1 mm. It is therefore possible to achieve the first and second display portions 103 and 104 formed of an ultra thin film of 5 mm or less even the first and second liquid crystal panel units 5 and 6 and reinforcing materials are included. In a conventional case using fluorescent tubes and LEDs as the light source, the light-emitting area of the light source is of a size from 1 mm to several mm, and in order to allow light from such a light source to go incident on the light guiding plates efficiently, the light guiding plates and their optical systems have to be of a size several times larger than the light-emitting area and a thickness of about 10 mm or more is necessary. Accordingly, the thickness is increased considerably when wires and reinforcing materials are included, which makes it difficult to achieve a reduction in size and in thickness.

It is necessary for the connection portion 2 to supply a laser beam from the laser light source 1 to the first and second light guiding plate units 3 and 4 homogeneously while wave-guiding the laser beam. To this end, the connection portion 2 has to diffuse a laser beam to first and second light guiding plate units 3 and 4 homogeneously. Herein, the connection portion 2 is provided with a hollow tube (not shown) to wave-guide light and the hollow tube is provided with a diffusing capability. The hollow tube supplies a laser beam to the first and second light guiding plate units 3 and 4 by diffusing the laser beam in a direction almost perpendicular to the light traveling direction. Also, a mirror 10 is provided to the connection portion 2 on the end face opposite to the end face on the side of the laser light source 1. By returning a laser beam entering into the connection portion 2 from the laser light source 1 on the mirror 10, it becomes possible to make the distribution of the laser beam within the connection portion 2 more homogeneous. Moreover, because the utilization efficiency of the laser beam is increased, low power consumption is enabled.

The connection portion 2 is furnished with a hinge capability and the first and second display portions 103 and 104 are foldable at the connection portion 2. By folding the first and second display portions 103 and 104, the liquid crystal display device can be made compact and easy to carry along. Because the laser light source 1 is used, it is possible to wave-guide light efficiently even when the thickness of the first and second display portions 103 and 104 is reduced to 5 mm or less. Accordingly, even when the display device is folded, it is as thin as 10 mm or less. Hence, a light, compact mobile display device can be achieved.

The hinge capability of the connection portion 2 that opens and closes the first and second display portions 103 and 104 will now be described in detail. FIG. 11A and FIG. 11B show an example of the configuration of the connection portion 2 furnished with the hinge capability. FIG. 11A is a top view and FIG. 11B is a side view. Herein, the first and second liquid crystal panel units 5 and 6 of FIG. 1B are omitted for ease of illustration.

As are shown in FIG. 11A and FIG. 11B, a plurality of hinges 110 are provided to the connection portion 2 and the first and second display portions 103 and 104 are connected to the connection portion 2 by a plurality of the hinges 110. The hinges 110 allow the first and second display portions 103 and 104 to open and close. Of the side faces of the connection portion 2, a surface other than a portion where the first and second light guiding plate units 3 and 4 are optically joined to the connection portion 2 has a reflection film 111. It is therefore designed in such a manner that a laser beam from the laser light source 1 will not leak to portions other than the first and second light guiding plate units 3 and 4 so as to enhance the utilization efficiency of a laser beam. By providing the reflection film on the side faces of the connection portion 2, the utilization efficiency of a laser beam is enhanced markedly, which enables low power consumption.

Figure 12A:
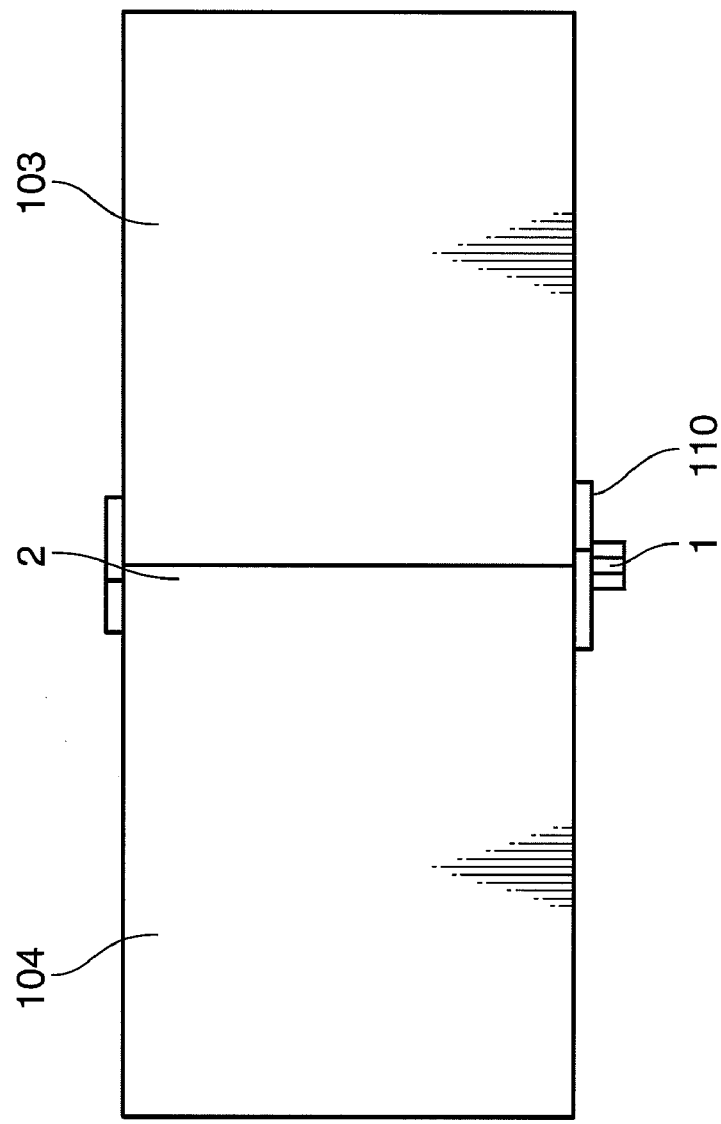
FIG. 12A and FIG. 12B show another example of the configuration of the connection portion furnished with the hinge capability.
Figure 12B:
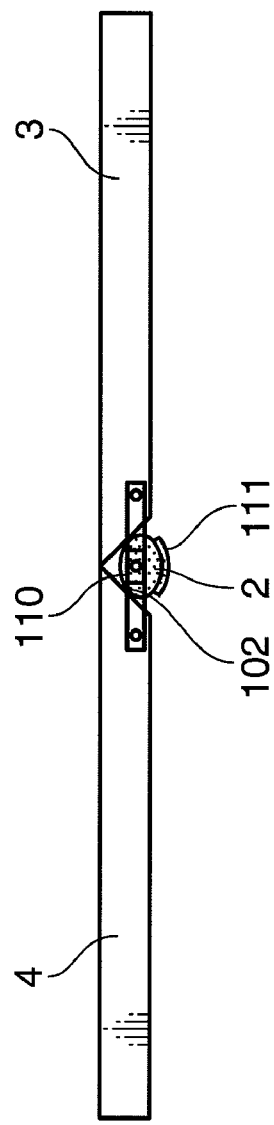

FIG. 12A and FIG. 12B show another example of the configuration of the connection portion 2 furnished with the hinge capability. FIG. 12A is a top view and FIG. 12B is a side view. As are shown in FIG. 12A and FIG. 12B, it is effective to form a light incident portion 102 of each of the first and second light guiding plate units 3 and 4 in a wedge shape. When the first and second light guiding plate units 3 and 4 are opened by the hinges 110, the joint between the first light guiding plate unit 3 and the second light guiding plate unit 4 becomes extremely small. Accordingly, when an image is displayed by opening the first and second light guiding plate units 3 and 4, a display of a large screen with a hardly noticeable joint is enabled.

Figure 13A:
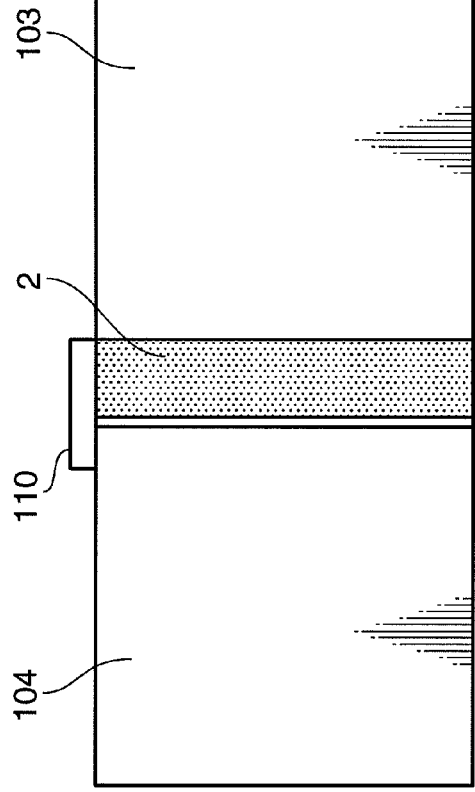
FIG. 13A through FIG. 13C show still another example of the configuration of the connection portion furnished with the hinge capability.
Figure 13B:
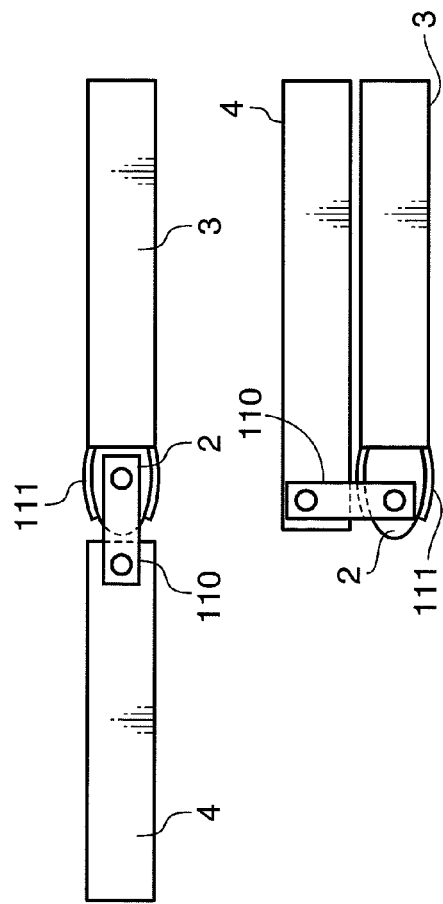
Figure 13C:
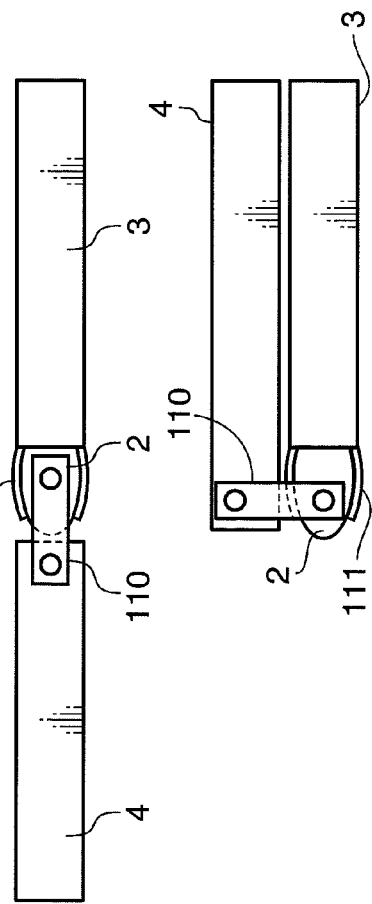

FIG. 13A through FIG. 13C shows still another example of the configuration of the connection portion 2 furnished with the hinge capability. FIG. 13A is a top view and FIGS. 13B and 13C are side views. The connection portion 2 is fixed to the end face (light incident portion) of the first light guiding plate unit 3 while it is linked to the second light guiding plate unit 4 via the hinges 110. The second display unit 104 is allowed to open and close by the hinges 110 of the connection portion 2. As is shown in FIG. 13B, the light incident portion of the second light guiding plate unit 4 is optically coupled to the connection portion 2 in an opened state, so that a laser beam from the connection portion 2 can be guided to the second light guiding plate unit 4. It thus becomes possible to expand the display screen further by opening and closing the first and second light guiding plate units 3 and 4. By fixing the connection portion 2 to one light guiding plate unit (first light guiding plate unit 3), the structure of the hinges 110 becomes simpler, which makes it possible to achieve a reduction in cost and enhancement in reliability.

In this embodiment, a structure to synchronize the opening and closing of the hinges 110 with the switching of the laser light source 1 is effective for low power consumption. By configuring in such a manner that the safety switch of the laser light source 1 goes OFF when the first and second light guiding plate units 3 and 4 are opened by the hinges 110 so that the laser light source 1 can emit light, it becomes possible to prevent the switch from coming ON erroneously when the user does not wish to display a screen. Also, by interlocking the opening and closing of the first and second light guiding plate units 3 and 4 with the switching of the laser light source 1, it becomes possible to prevent light from the laser light source 1 from being wave-guided to portions other than the first and second light guiding plate units 3 and 4. Owing to the ability to prevent illumination of a laser beam to portions other than the first and second display portions 103 and 104, there can be achieved an advantage that the safety is enhanced.

In this embodiment, a hollow tube containing diffusing particles or a hollow tube containing an empty space are available as the connection portion 2 that wave-guides a laser beam. Further, a diffusing portion may be provided to the connection portion 2. FIG. 2A and FIG. 2B show the connection portion 2 provided with the diffusing portion that diffuses a laser beam. As is shown in FIG. 2, by providing a diffusing portion 7 in a concavo-convex shape inside the connection portion 2, it becomes possible to control the diffusion distribution of a laser beam. By designing the shape of the diffusing portion 7, a laser beam can be illuminated to the first and second light guiding plate units 3 and 4 homogeneously by diffusing the laser beam homogeneously. For example, in a case where a laser beam enters from one end face of the connection portion 2, the laser beam is wave-guided in the connection portion 2 while the intensity is lowered by being diffused to the first and second light guiding plate units 3 and 4 at the same time. By tuning the diffusion strength of the diffusing portion 7 in the length direction of the connection portion 2 according to the intensity distribution of a laser beam present along such a propagation direction, it becomes possible to maintain the intensity distribution of a laser beam diffused to the first and second light guiding plate units 3 and 4 from the entire connection portion 2 to be a homogeneous distribution. Also, by providing the diffusing portion 7, a laser beam can be diffused without disturbing polarization. Consequently, the utilization efficiency of a laser beam at the first and second liquid crystal panel units 5 and 6 that control transmission of light using polarization of light is increased markedly by a factor of 1.5 or more. Low power consumption is thus enabled.

In this embodiment, a structure in which the side faces of the hollow tube provided to the connection portion 2 are covered with a reflection layer in portions other than the portion through which a laser beam is wave-guided to the first and second light guiding plate units 3 and 4 is preferable. By preventing scattering of a laser beam to unwanted portions, the utilization efficiency of a laser beam can be enhanced. Also, it becomes possible to prevent an event that a laser beam leaking to other portions turns into stray light of a video and irradiates the user.

Figure 16:
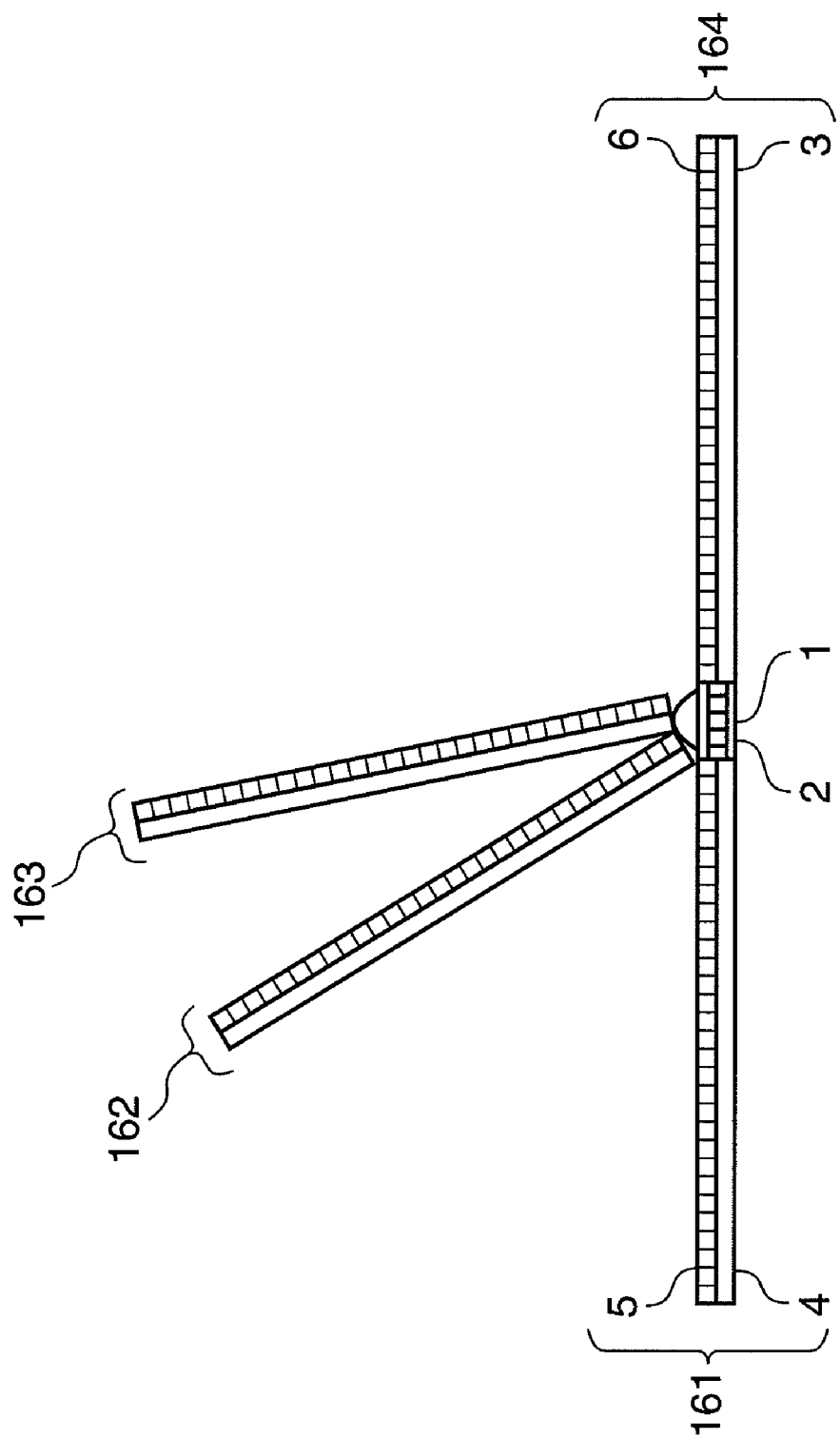
FIG. 16 is a schematic view used to describe the configuration of a liquid crystal display device formed of four display portions and one connection portion.

This embodiment described the configuration formed of two display portions and one connection portion. However, a configuration formed of a plurality of display portions and the connection portion connecting these display portions is also effective. FIG. 16 shows a configuration formed of four display portions and one connection portion. As is shown in FIG. 16, four display portions 161, 162, 163, and 164 are connected to one connection portion 2. According to this configuration, the display area is increased and a plurality of display portions furnished with different capabilities are connected to the connection portion 2, so that the respective liquid crystal panel units are illuminated by light supplied from the connection portion 2.

Figure 17A:
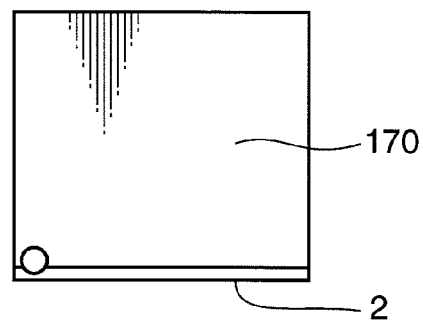
FIG. 17A through FIG. 17C are schematic views used to describe the configuration to connect a plurality of display portions to one connection portion.
Figure 17B:
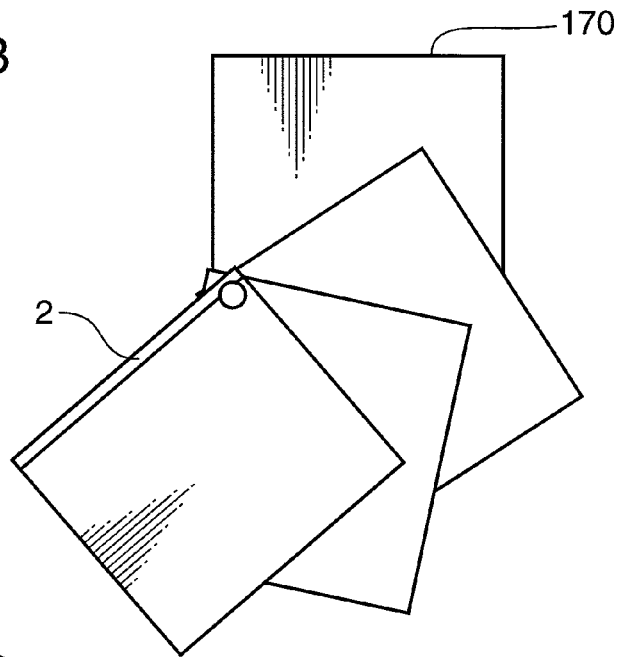
Figure 17C:
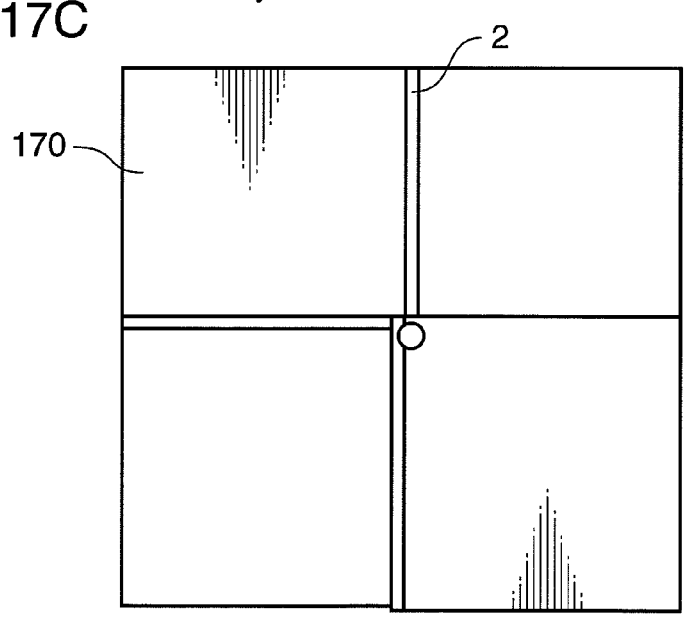

Examples of the configuration to connect a plurality of display portions to one connection portion include the following configurations. As are shown in FIG. 17A through FIG. 17C, a configuration in which a plurality of display portions 170 are spread in a fan shape and the connection portions 2 are provided between the respective display portions 170 so that a laser beam is supplied via the connection portions 2 is effective for a reduction in size. Also, as are shown in FIGS. 18A and 18B, disposing a plurality of display portions 170 and a plurality of connection portions 2 that sequentially connect the display portions 170 in series is also effective for a reduction in size. The display area is increased by sliding the display portions 170 and a laser light source is inputted via the connection portions 2. By using a laser beam as the light source, the display portions 170 can be extremely thin, which makes it possible to laminate a plurality of display portions 170. Because the number of connection portions 2 can be reduced for the display portions 170, so is the number of light sources. Further, as will be described below, by adopting a structure in which light from the light source is guided to the connection portion 2 using an optical interconnection, it becomes possible to supply a laser beam to a plurality of connection portions 2 using fewer light sources, which is advantageous for a reduction in size and in cost. By using the laser light source, light can be supplied to the coupling portion and the transmittance portion without any loss even when the optical interconnection is used. It is also possible to supply a laser beam selectively to the light guiding plate units by providing an optical switch between the laser light source and the optical interconnection. By selectively supplying a laser beam to the liquid crystal display panel and stopping a supply to the display portion not in use, the display portions can be used effectively and power consumption can be reduced.

Figure 3A:
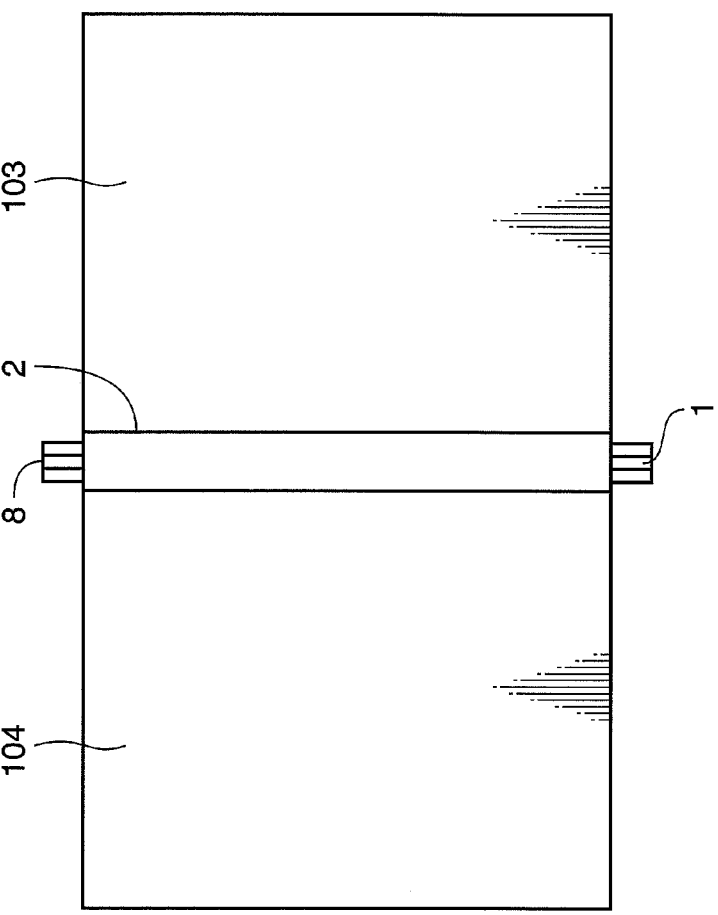
FIG. 3A and FIG. 3B are schematic views used to describe the configuration of the liquid crystal display device according to the first embodiment of the invention.
Figure 3B:
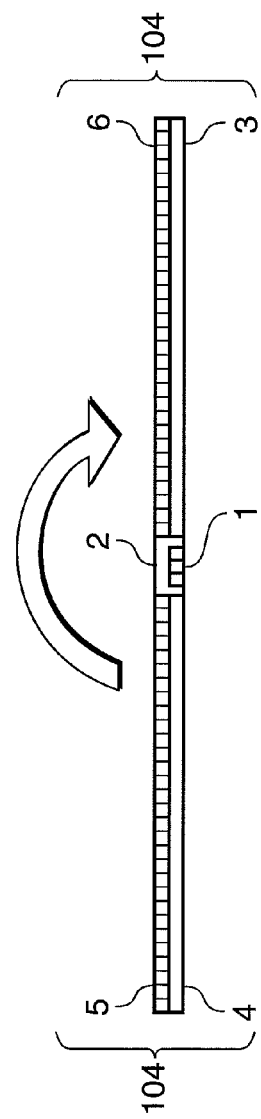

In this embodiment, as are shown in FIG. 3A and FIG. 3B, a configuration in which a laser light source 8 is added to the other end of the connection portion 2 in the configuration of FIG. 1A and FIG. 1B is also effective. It is a configuration to supply a laser beam by providing the laser light sources 1 and 8 to the both end faces of the connection portion 2. As the laser light source, RGB lasers are used. A red laser light source is used as the laser light source 1 and a blue laser light source and a green laser light source are used as the laser light source 8. By spacing the laser light sources 1 and 8 apart from each other, heat generation of the laser light sources 1 and 8 can be distributed. Heat release of the laser light sources 1 and 8 is thus improved markedly, which enhances the reliability of the laser light sources 1 and 8 and improves the luminous efficiency. Regarding the layout of the laser light sources 1 and 8, besides the configuration to dispose laser light sources having different wavelengths at different positions, a configuration using a plurality of laser light sources is also effective. By using a plurality of laser light sources, the intensity of a laser beam can be increased and a brighter screen can be achieved. Also, when some of a plurality of laser light sources are used as spare light sources, even when the life of laser light sources of regular use has expired, the spare light sources can be used instead. Besides the foregoing, it is also possible to achieve color reproducibility in a wider range by using laser light sources having wavelengths other than those of RGB. In addition, besides the configuration to allow a laser beam to enter from the both ends of the connection portion 2, it is also possible to provide a light incident portion in other portions, such as the side face and the back side of the connection portion 2, so that light is allowed to go incident on the light incident portion thus provided.

In this embodiment, as is shown in FIG. 4, it may be configured in such a manner that an optical interconnection 24 is added to the configuration of FIG. 1A and FIG. 1B, so that laser beams from respective laser light sources 21, 22, and 23 are supplied to the connection portion 2 via the optical interconnection 24. A fiber or a waveguide can be used as the optical interconnection 24. By using the optical interconnection, it becomes possible to dispose a plurality of the laser light sources 21, 22, and 23 apart from one another. By spacing the laser light sources 21, 22, and 23 apart from one another, heat release of the laser light sources 21, 22, and 23 becomes easy. Hence, both the reliability and the luminous efficiency of the laser light sources 21, 22, and 23 can be enhanced. As the positions of the laser light sources 21, 22, and 23, the periphery or the back side the first and second display portions 103 and 104 are effective. Because the back side has a wide area, it is effective for heat release of the laser light sources 21, 22, and 23. Also, in a case where the optical interconnection 24 is used, as is shown in FIG. 3, it is effective to supply light from different places of the connection portion 2 for homogenization. Making the distribution of a laser beam homogeneous within the connection portion 2 is effective to make distribution of light within the planes of the first and second light guiding plate units 3 and 4 homogeneous. In this instance, by allowing laser beams to enter into the connection portion 2 from a plurality of places, light readily becomes homogeneous within the connection portion 2.

This embodiment described the configuration using three RGB laser light sources. However, a larger number of laser light sources can be readily used as well. A laser light source having a weak output can be readily fabricated at a low cost. It is possible to obtain satisfactory luminance by using a plurality of such low-output light sources. Further, by using a plurality of light sources, even when one of the light sources is broken, compensation can be made by the other light sources. The reliability of the light source can be thus enhanced markedly. Further, by adding a blue-green light source in addition to the RGB light sources, it becomes possible to broaden the chromaticity range that can be expressed. In these cases, a configuration to collect laser beams using the optical interconnection is effective. Further, by disposing a plurality of light sources apart from one another in a wide area, it becomes possible to suppress a temperature rise in each laser light source. Hence, it becomes possible to achieve an excellent heat releasing effect as well as enhancement in reliability and enhancement in luminous efficiency of the laser light source. A flexible interconnection, such as a plastic waveguide, is preferable as the optical interconnection. However, an optical fiber and an organic fiber are also available.

In this embodiment, the laser light source is disposed on the side face of the liquid crystal display device. However, it is also possible to dispose the laser light source to other portions, such as the back side of the display portion and other peripheral portions of the display portion.

In this embodiment, as are shown in FIG. 5A through FIG. 5C, a configuration in which an optical interconnection 51 is provided to the connection portion 2 and a laser beam is supplied to the first and second light guiding plate units 3 and 4 respectively in the first and second display portions 103 and 104 via the optical interconnection 51 is also effective. FIG. 5C shows an enlarged view of the optical interconnection 51 in a portion A of FIG. 5A. The optical interconnection 51 is divided to a plurality of branches and light is supplied to the first and second light guiding plate units 3 and 4 by diffusing the light at diffusing portion 52 provided to the tip of each branch. Hence, the optical interconnection 51 makes it possible to supply light to the first and second light guiding plate units 3 and 4 from a plurality of the light diffusing portions 52. Because a loss can be lessened by the optical interconnection 51, low power consumption is enabled. When a transparent organic material is used for the optical interconnection 51, a flexible structure resistant to bending can be achieved. Hence, a configuration in which the first and second display portions 103 and 104 can be bent by bending the connection portion 2 can be achieved, which makes it possible to achieve a compact device.

Second Embodiment

A second embodiment of the invention will now be described. In a case where a laser light source is used as a liquid crystal backlight unit, a problem of speckle noises arises. Speckle noises are a phenomenon that the image quality is deteriorated by the interference effect caused by high coherence of a laser beam. It is necessary to reduce speckle noises in order to achieve a high-quality image. A configuration to change a diffusion state of a laser beam timewise is effective to prevent speckle noises. This embodiment is an embodiment in which a configuration to reduce speckle noises is provided to the liquid crystal display device of the first embodiment above. This embodiment is aimed at a compact portable liquid crystal display device and describes a speckle noise reducing method capable of achieving a compact configuration. In order to reduce speckle noises, it is necessary to vary a light interference pattern timewise. Further, in order to achieve a compact portable device, a compact speckle noise reducing mechanism is necessary.

FIG. 6A and FIG. 6B are schematic views used to describe the configuration of a liquid crystal display device of this embodiment. FIG. 6A is a top view and FIG. 6B is a side view. FIG. 6A and FIG. 6B show an example of the configuration to reduce speckle noises. The example of the configuration to reduce speckle noises shown in FIG. 6A and FIG. 6B is provided with a hollow tube 61 that puts a liquid that contains diffusing particles 63 in motion using a micro pump 62 inside the connection portion 2. FIG. 6C shows the cross section of the connection portion 2 and a liquid containing the diffusing particles 63 is flowing inside the hollow tube 61 having an empty space. The liquid is flown inside the hollow tube 61 by the micro-pump 62. A laser beam is diffused by the diffusing particles 63 and guided to the first and second light guiding plate units 3 and 4. The diffusion state varies timewise as the liquid flows, which makes it possible to reduce speckle noises markedly. Particles of the order of several microns to sub μm, which is the wavelength order of light, are effective as the diffusing particles 63. By selecting materials so that the refractive index of particles and the refractive index of the liquid are different, the diffusing effect can be obtained.

By adopting the structure to flow a liquid having a refractive index higher than a refractive index of the material of the hollow tube 61, it becomes possible to wave-guide a laser beam to the liquid inside the hollow tube 61, which can in turn enhance the scattering effect. For example, when glycerin is used as the liquid, then oxides, such as $SiO_2$, $Ta_2O_5$, $Nb_2O_5$, and ZnO, are used as the particles because a loss is small and the state is stabilized. A compact speckle noise reducing mechanism can be achieved by a micro pump using an MEMS and a microscopic hollow tube.

Figure 7A:
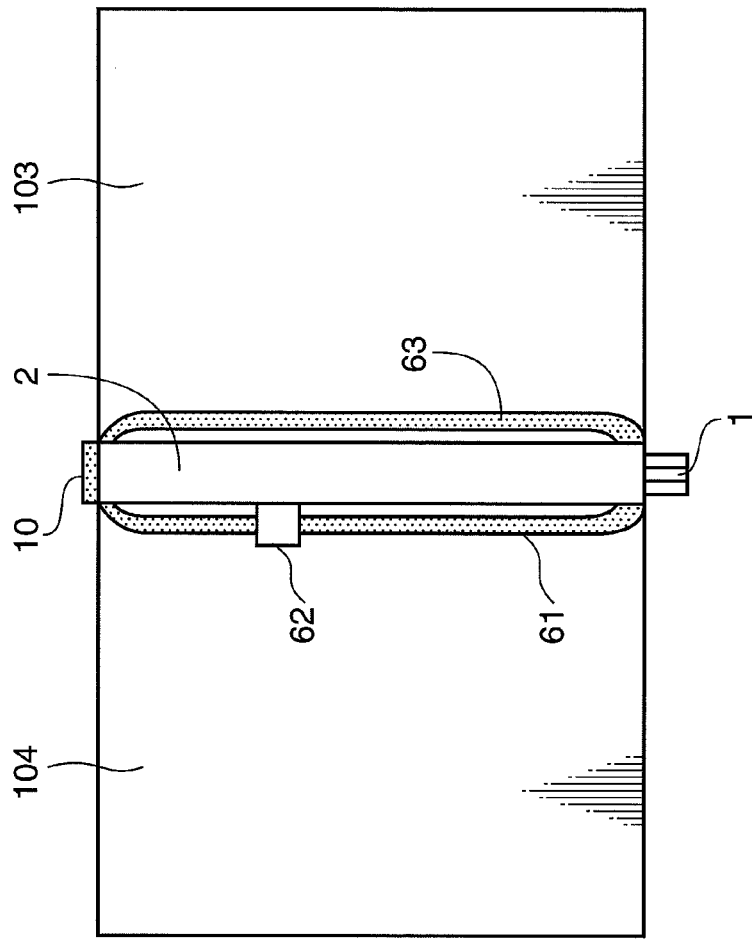
FIG. 7A and FIG. 7B are schematic views used to describe another configuration of the liquid crystal display device according to the second embodiment of the invention.
Figure 7B:
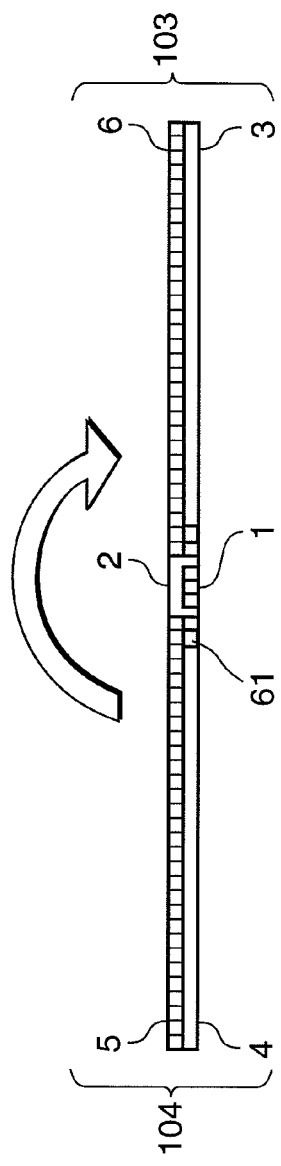

FIG. 7A and FIG. 7B are schematic views used to describe another configuration of the liquid crystal display device of this embodiment. FIG. 7A is a top view and FIG. 7B is a side view. FIG. 7A and FIG. 7B show an example of another configuration to reduce speckle noises. The example of the configuration to reduce speckle noises shown in FIG. 7A and FIG. 7B is a configuration in which a hollow tube 61 containing diffusing particles 63 and a connection portion 2 furnished with the diffusing capability are combined. Speckle noises can be reduced by diffusing a laser beam that has been diffused in the connection portion 2 and to be wave-guided to the first and second light conducting plate units 3 and 4 by the hollow tube 61. The principle to reduce speckle noises is the same as that in the example of the configuration shown in FIG. 6A and FIG. 6B. However, by providing the hollow tube 61 that converts the diffusion state inside the first and second light guiding plate units 3 and 4, the speckle noise reducing effect can be enhanced.

FIG. 8A and FIG. 8B are schematic views used to describe still another configuration of the liquid crystal display device of this embodiment. FIG. 8A is a top view and FIG. 8B is a side view. FIG. 8A and FIG. 8B show still another example of the configuration to reduce speckle noises. The example of the configuration to reduce speckle noises shown in FIG. 8A and FIG. 8B is a configuration that can vary the diffusion state by moving a diffusing tube 91 containing diffusing particles using a motor 93 instead of the hollow tube 61 shown in FIG. 7A and FIG. 7B. Regarding the diameter of the diffusing tube 91, when the thickness of the connection portion 2 is about 10 μm, it is sufficient to have a diameter of several tens μm or more, which is necessary for a laser beam diffused from the connection portion 2 to traverse. The diffusing tube 91 is of a structure in which a flexible transparent organic material is mixed with diffusing particles. It is a structure in which light diffused from the connection portion 2 traverses the diffusing tube 91 before the light goes into the first and second light guiding plate units 3 and 4. A volume even together with a volume of the ultra compact motor 93 is small enough to be mounted on a compact portable device.

Figure 9A:
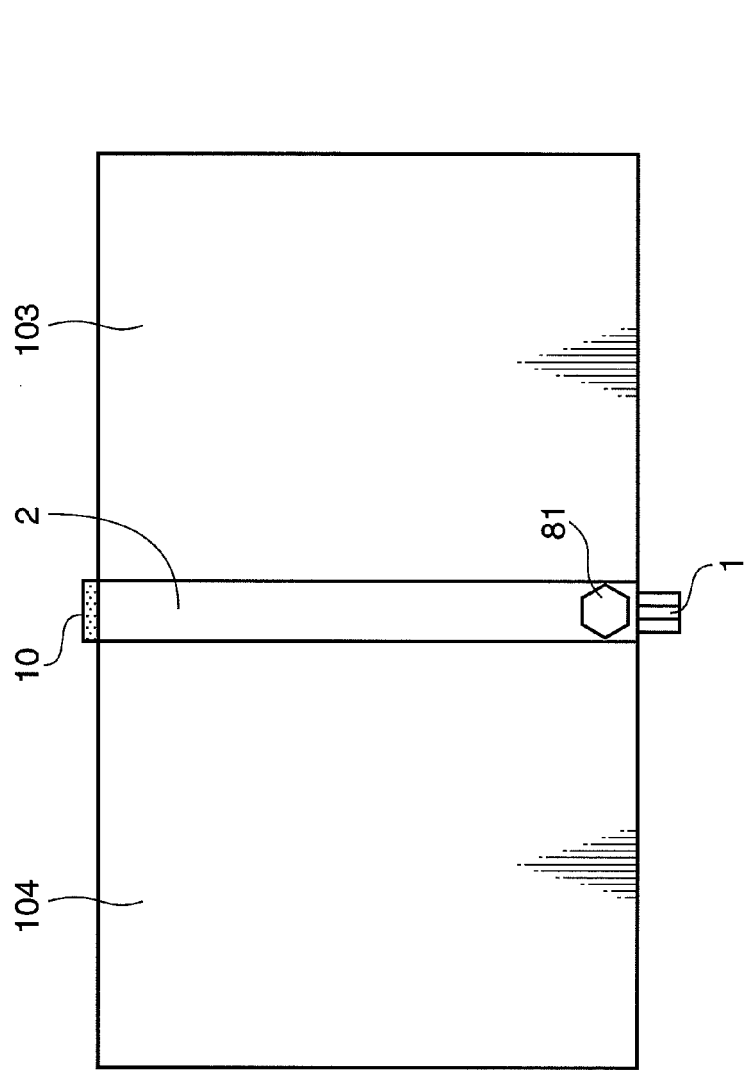
FIG. 9A and FIG. 9B are schematic views used to describe still another configuration of the liquid crystal display device according to the second embodiment of the invention.
Figure 9B:
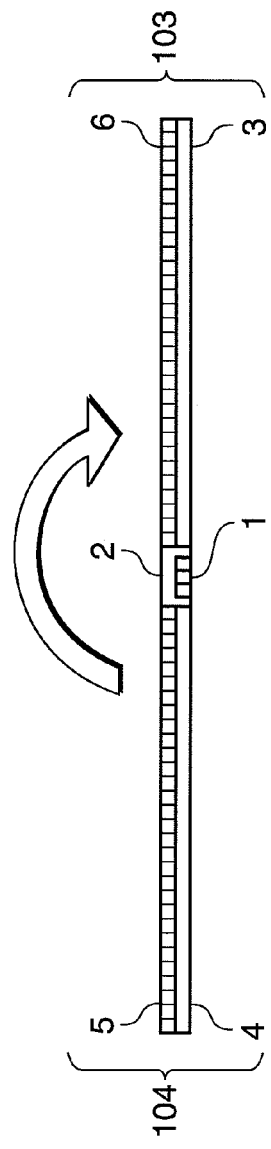

FIG. 9A and FIG. 9B are schematic views used to describe still another configuration of the liquid crystal display device of this embodiment. FIG. 9A is a top view and FIG. 9B is a side view. FIG. 9A and FIG. 9B show still another example of the configuration to reduce speckle noises. The example of the configuration to reduce speckle noises shown in FIGS. 9A and 9B is a configuration to change an emission direction of a laser beam from the laser light source 1 timewise by a rotating prism 81. A hollow tube is provided to the connection portion 2 to wave-guide light and the hollow tube is furnished with the diffusing capability. By changing the emission direction of a laser beam, a scattering state of light passing inside the hollow tube provided to the connection portion 2 is varied. The light paths of a laser beam wave-guided to the first and second light guiding plate units 3 and 4 are thus changed and speckle noises can be reduced. By providing a compact prism rotating mechanism using an MEMS, it becomes possible to achieve an ultra compact configuration that can be mounted onto a portable device. Alternatively, a compact scan mirror by an MEMS is effectively used instead of the rotating prism.

Third Embodiment

Figure 10A:
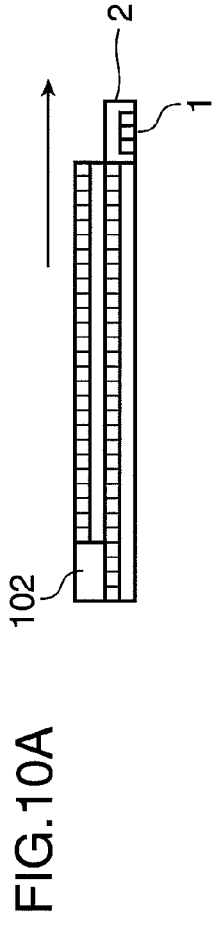
FIG. 10A through FIG. 10D are schematic views used to describe the configuration of a liquid crystal display device according to a third embodiment of the invention.
Figure 10B:
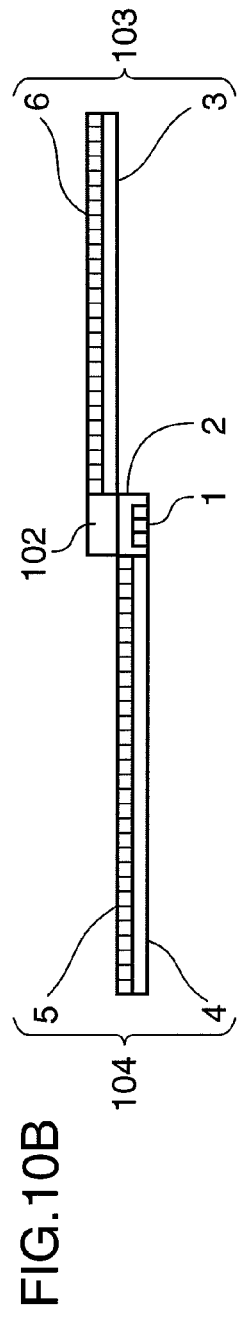

A third embodiment of the invention will now be described. This embodiment will describe an embodiment using liquid crystal panel units configured to slide with reference to FIG. 10A through FIG. 10D. FIG. 10A and FIG. 10B are schematic views used to describe the configuration of a liquid crystal display device of this embodiment. FIG. 10A is a side view before the liquid crystal panel unit is slid (when accommodated) and FIG. 10B is a side view after the liquid crystal display panel unit is slid (when expanded).

As are shown in FIG. 10A and FIG. 10B, the liquid crystal display device of this embodiment expands the display area of the liquid crystal display device by sliding the first and second display portions 103 and 104 in mutually different directions. By sliding the first and second display portions 103 and 104 and bringing the connection portion 2 into contact with a light incident portion 102, a laser beam from the laser light source 1 propagates to the light incident portion 102 and the first light guiding plate unit 3 via the connection portion 2 and illuminates the first liquid crystal panel unit 6 from the back side. Meanwhile, a laser beam is supplied to the second light guiding plate unit 4 that has been constantly in contact with the connection portion 2 since the accommodated state in the same manner as above so as to illuminate the second liquid crystal panel unit 5. The configuration of the connection portion in either the first or second embodiment is available as the structure of the connection portion 2.

Figure 10C:
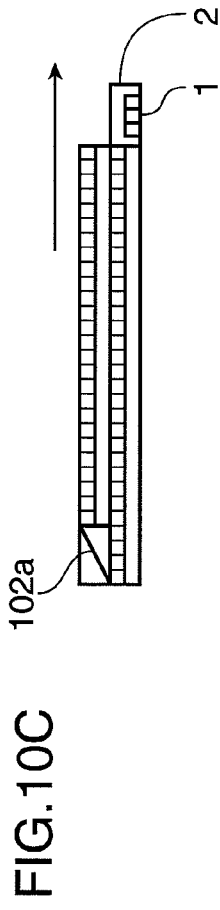
Figure 10D:
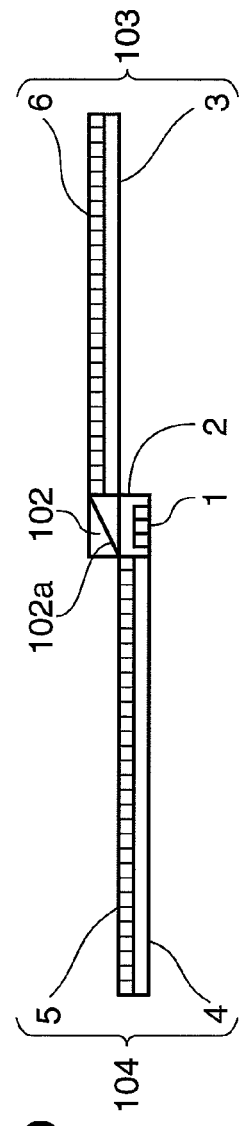

FIG. 10C and FIG. 10D are schematic views used to describe another configuration of the liquid crystal display device of this embodiment. FIG. 10C is a side view before the liquid crystal display panel unit is slid (when accommodated) and FIG. 10D is a side view after the liquid crystal display panel unit is slid (when expanded). As are shown in FIG. 10C and FIG. 10D, it may be configured in such a manner that a mirror structure is adopted by disposing a mirror 102a to the light incident portion 102, so that a laser beam diffused by the connection portion 2 is reflected on the mirror 102a of the light incident portion 102 diagonally and wave-guided to the first light guiding plate unit 3.

According to this embodiment, by opening and closing the first and second display portions by the sliding method, it becomes possible to make the device compact enough to be portable with an expandable display area.

Fourth Embodiment

A fourth embodiment of the invention will now be described. FIG. 14A and FIG. 14B are schematic views used to schematically describe the configuration of a liquid crystal display device according to a fourth embodiment of the invention. FIG. 14A is a top view and FIG. 14B is a side view.

As is shown in FIG. 14A and FIG. 14B, the liquid crystal display device of this embodiment is configured in such a manner that a first display portion 103 and a second display portion 104 are connected using a connection portion 2 and a laser beam is supplied from a laser light source 1 connected to the connection portion 2. As is shown in FIG. 14B, the first display portion 103 is formed of a first liquid crystal panel unit 6 and a first light guiding plate unit 3 disposed in contact with the back side of the first liquid crystal panel unit 6, while the second display unit 104 is formed of a second liquid crystal panel unit 5 and a second light guiding plate unit 4 disposed in contact with the back side of the second liquid crystal panel unit 5. A laser beam is supplied to the first and second light guiding plate units 3 and 4 via the connection portion 2 and a laser beam passing through the first and second light guiding plate units 3 and 4 serves as a planar light source and illuminates the first and second liquid crystal panel units 5 and 6. The connection portion 2 is provided with a hollow tube (not shown) to wave-guide light and the hollow tube is furnished with the diffusing capability. The hollow tube supplies a laser beam to the first and second light guiding plate units 3 and 4 by diffusing the laser beam in a direction almost perpendicular to the light traveling direction. In addition, the connection portion 2 is provided with a mirror 10 on the end face opposite to the end face on the side of the laser light source 1.

As is shown in FIG. 14A, the liquid crystal display device of this embodiment further includes a luminometer 131 disposed in the vicinity of the surface of the first liquid crystal panel unit 6 in the first display portion 103, an optical switch 132 provided to the connection portion 2, a display control circuit 133, a light amount control circuit 134, and an optical switch control circuit 135. The luminometer 131 measures luminance of outside light illuminating the first display portion 103 and outputs the measurement result to the display control circuit 133, the light amount control circuit 134, and the optical switch control circuit 135. The optical switch 132 makes a switching action to enable or disable a supply of a laser beam to the first and second light guiding plate units 3 and 4 from the connection portion 2 according to a control signal from the optical switch control circuit 135.

The display control circuit 133 is connected to the first and second liquid crystal panel units 5 and 6 and controls the first and second liquid crystal panel units 5 and 6 by outputting an image signal that drives the first and second liquid crystal panel units 5 and 6 and thereby controls an image to be displayed on the first and second liquid crystal panel units 5 and 6. The light amount control circuit 134 is connected to the laser light source 1 and outputs a drive current that drives the laser light source 1 and thereby controls a light amount of a laser beam to be emitted from the laser light source 1. The light amount control circuit 134 performs light amount control on a laser beam from the laser light source 1 by referring to the measurement result from the luminometer 131 and an image controlled by the display control circuit 133. The optical switch control circuit 135 is connected to the optical switch 132 provided to the connection portion 2 and makes a switching action to enable or disable a supply of a laser beam to the first and second light guiding plate units 3 and 4 from the connection portion 2 by controlling the optical switch 132. The optical switch control circuit 135 makes a switching action to enable or disable a supply of a laser beam to the first and second light guiding plate units 3 and 4 by referring to the measurement result from the luminometer 131 and an image controlled by the display control circuit 133.

Figure 15:
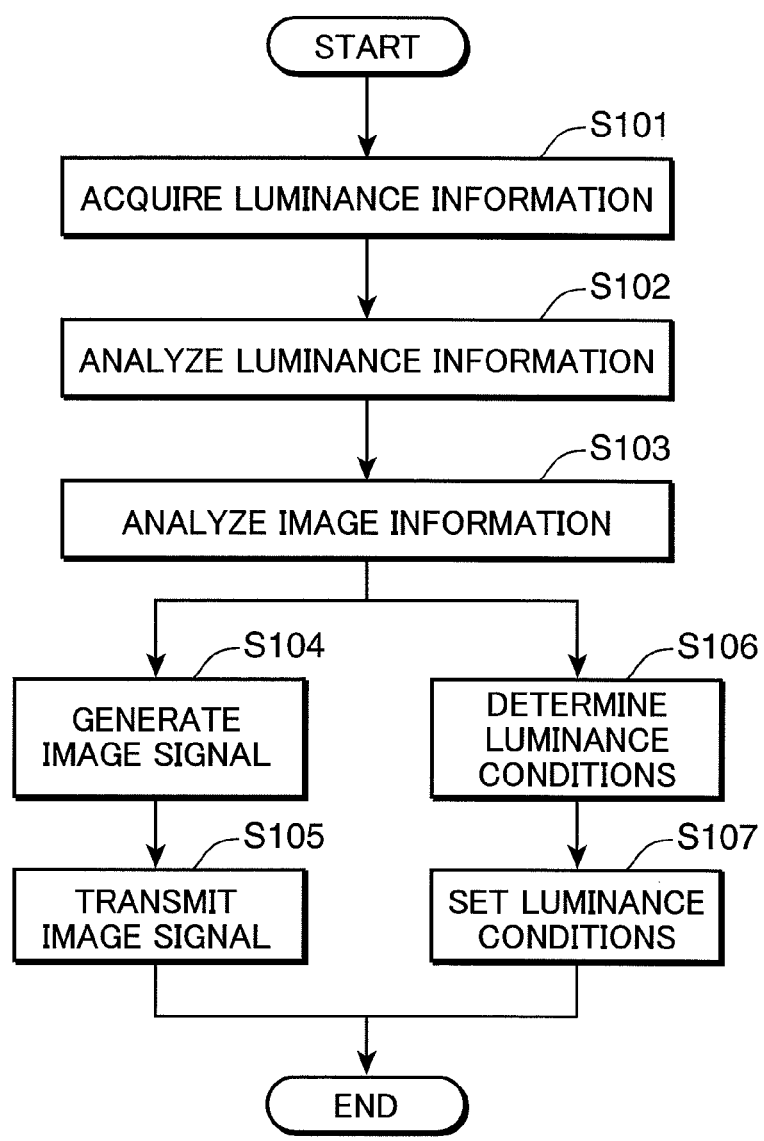
FIG. 15 is a flowchart depicting an operation of the liquid crystal display device according to the fourth embodiment of the invention.

In the liquid crystal display device of this embodiment, the luminometer 131 is provided in the vicinity of the surface of the first display portion 103, that is, in the vicinity of the surface of the first liquid crystal panel unit 6 and the light amount control circuit 134 that controls a light amount of the laser light source 1 according to a signal from the luminometer 131 is also provided. The light amount control circuit 134 controls a light amount of the laser light source 1 according to a signal from the display control circuit 133. When configured in this manner, it becomes possible, for example, to make brightness of the first and second liquid crystal panel units 5 and 6 homogeneous according to a signal from the display control circuit 133 and to make either one of the first and second liquid crystal panel units 5 and 6 brighter by increasing the luminance or darker by conversely decreasing the luminance. Consequently, the display quality of a display screen of the multi-panel configuration can be enhanced markedly. FIG. 15 is a flowchart depicting an operation of the liquid crystal display device of this embodiment. Hereinafter, an operation of the liquid crystal display device of this embodiment will be described using FIG. 15.

Referring to FIG. 15, luminance information about outside light, which is the measurement result of the luminometer 131, is acquired first (Step S101), and the luminance of outside light is analyzed on the basis of the acquired luminance information (Step S102). These Steps S101 and S102 are performed, for example, by the display control circuit 133. It goes without saying, however, that the light amount control circuit 134 and the optical switch control circuit 135 or a separate control circuit may be prepared to this end.

Subsequently, information of an image to be displayed on the first and second liquid crystal display panel units 5 and 6 is analyzed (Step S103). The luminance of the image is determined from the analysis result, and the luminance of outside light analyzed in Step S102 is referred to when the luminance is determined. When the luminance of the image is determined, an image signal to be outputted to the first and second liquid crystal panel units 5 and 6 is generated (Step S104), and the image signal thus generated is sent to the first and second liquid crystal panel units 5 and 6 (Step S105).

Meanwhile, when the luminance of the image is determined, luminance of a laser beam to be emitted from the laser light source 1, that is, luminance of the light sources of respective colors in a case where the laser light source 1 uses RGB light sources, and luminance conditions, such as output ratio of the respective colors, are determined by the light amount control circuit 134 (Step S106). Then, the luminance conditions thus determined are set in the laser light source 1 by controlling a drive current of the laser light source 1 (Step S107).

In a case where the laser light source 1 of this embodiment uses RGB light sources, it is possible to control colors of the image on the first and second display units 103 and 104 to be in an optimal state by detecting RGB components of the outside illumination (outside light). The luminometer 131 detects the RGB components of outside illumination separately. On the basis of this information, the display control circuit 133 analyzes the luminance information about the outside illumination and determines image information and the luminance of the RGB laser light sources on the basis of the image to be displayed and then performs the control on the image information and the light amount control on a laser beam.

In a case where the liquid crystal display device is used as a portable terminal and an image is viewed outdoors, the liquid crystal display device is often susceptible to outside light. Because types of outside light differ from place to place, it is necessary to adjust the RGB components of illumination light to be displayed through spectrum analysis on outside light in order to view an image constantly in an optimal state. The liquid crystal display device of this embodiment enables the foregoing.

Fifth Embodiment

A fifth embodiment of the invention will now be described. FIG. 19A and FIG. 19B are schematic views used to describe the configuration of a liquid crystal display device using a planar light source according to the fifth embodiment of the invention. FIG. 19A is a top view and FIG. 19B is a side view. Also, FIG. 19C is a cross section taken on line B-B of FIG. 19A.

A display portion 204 of the liquid crystal display device of this embodiment includes a liquid crystal panel unit 205 and a light guiding plate unit 207 provided in contact with the back side of the liquid crystal panel unit 205. It is configured in such a manner that when a laser beam is supplied to the light guiding plate unit 207 from laser light sources 201, the light serves as a planar illumination light source and illuminates the liquid crystal panel unit 205. Herein, a plurality of laser light sources 201 are prepared. However, it goes without saying that only a single laser light source 201 may be used. In short, it is sufficient that an output large enough to supply a laser beam across the entire surface of the liquid crystal panel unit 205 is ensured by one or more than one laser light source 201.

The liquid crystal display device of this embodiment includes a diffusing portion formed of a hollow tube 203 filled with a diffusing liquid 206 and a micro pump 202 in order to diffuse and supply laser beams from the laser light sources 201 to the light guiding plate unit 207. The diffusing liquid 206 is a liquid containing diffusing particles and almost fully filled in the hollow tube 203. The diffusing liquid 206 is put in motion inside the hollow tube 203 by the micro pump 202. As the diffusing liquid 206 is put in motion, the diffusion state of a laser beam passing through the hollow tube 203 varies timewise. Laser beams emitted from the laser light sources 201 are diffused as they traverse the diffusing liquid 206 inside the hollow tube 203 and then wave-guided to the light guiding plate unit 207. Speckle noises of laser beams are reduced as the diffusion state is varied timewise with flow motion of the diffusing liquid 206.

The light guiding plate unit 207 of this embodiment is provided with a reflection film 208 on the end face. The reflection film 208 reflects a laser beam, which has reached there by passing through the light guiding plate unit 207 without being diffused, toward the liquid crystal panel unit 205 and thereby prevents leakage of a laser beam from the light guiding plate unit 207. It is therefore designed in such a manner that light from the laser light sources 201 will not leak to portions other than the light guiding plate unit 207 so as to enhance the utilization efficiency of laser beams. By providing the reflection film 208 on the end face of the light guiding plate unit 207, the utilization efficiency of light is enhanced markedly and low power consumption is enabled. Further, by providing the reflection film 208, laser beams traverse the hollow tube 203 containing the diffusing liquid 206 more than once. This configuration provides an effect of reducing speckle noises of laser beams further. Because the diffusing portion can be achieved without substantially increasing a volume of the display portion 204 by using the hollow tube 203 having a diameter of several to 10 mm and the compact micro pump 202, this configuration is effective for a reduction in thickness and in weight of the liquid crystal display device. In particular, in this embodiment, the overall device can be thinner by disposing the diffusing portion inside the light guiding plate unit 207.

The diffusing liquid 206 of this embodiment has an effect of releasing heat generated in the laser light sources 201. By bringing the diffusing liquid 206 into contact with the laser light sources 201 directly or via a heat sink (not shown) of the laser light sources 201, it becomes possible to enhance the heat releasing effect on heat generation in the laser light sources 201. By putting the diffusing liquid 206 in motion widely within a two-dimensional plane, it becomes possible to carry heat generated in the laser light sources 201 to the light guiding plate 207 entirely, which makes it possible to reduce heat resistance of the laser light sources 201 markedly. Accordingly, low power consumption can be achieved by enhancement of the reliability and enhancement of the luminous efficiency of the laser light sources 201. Further, by disposing the diffusing portion on the side face or on the back side of the display portion 204, it becomes possible to release heat from a wide area.

In this embodiment, the diffusing portion is disposed inside the light guiding plate unit 207. However, it may be disposed so as to surround the light guiding plate unit 207. When configured in this manner, the configuration of the light guiding plate unit 207 can be simpler, which can in turn reduce the manufacturing costs of the overall device.

FIG. 20A and FIG. 20B are schematic views used to describe another configuration of the liquid crystal display device using the planar light source according to the fifth embodiment of the invention. FIG. 20A is a top view and FIG. 20B is a side view. FIG. 20C is a cross section taken on line C-C of FIG. 20A. As are shown in FIG. 20A through FIG. 20C, a plurality of hollow tubes 203 are provided so that a laser beam traverses a plurality of the hollow tubes 203. This configuration can enhance the diffusing effect, which can in turn increase the speckle noise reducing effect.

FIG. 21A and FIG. 21B are schematic views used to describe still another configuration of the liquid crystal display device using the planar light source according to the fifth embodiment of the invention. FIG. 21A is a top view and FIG. 21B is a side view. FIG. 21C is a cross section taken on line D-D of FIG. 21A. As are shown in FIG. 21A through 21C, by configuring in such a manner that a hollow tube 203 wound two-dimensionally is disposed so that a laser beam passes through the hollow tube 203 by traversing more than once. This configuration can enhance the diffusing effect, which can in turn increase the speckle noise reducing effect.

FIG. 22A through FIG. 22C are schematic views used to describe still another configuration of the liquid crystal display device using the planar light source according to the fifth embodiment of the invention. FIG. 22A is a top view and FIG. 22B and FIG. 22C are side views. The configuration of FIG. 22A through FIG. 22C is a configuration using two light guiding plates. The light guiding plate unit is formed of a first light guiding plate 213 and a second light guiding plate 212. A diffusing portion is provided to the first light guiding plate 213 and a laser beam from a laser light source 201 goes incident on the side face of the first light guiding plate 213. The first light guiding plate 213 increases the in-plane homogeneity by diffusing a laser beam and then guides light reflected on a reflection portion 211 to the second light guiding plate 212. The second light guiding plate 212 is in contact with the back side of the liquid crystal panel unit 205 and illuminates the liquid crystal panel unit 205. Providing the first light guiding plate 213 is effective because a light amount distribution within the plane become homogeneous. Also, because the light-emitting area of the laser light source 201 is small, the first light guiding plate 213 can be made thinner. Hence, an increase in volume is extremely small even when the light guiding plate unit is formed by laminating two plates. A reduction in size can be thus achieved.

When a flexible transparent tube is used as the hollow tube, it becomes easy to dispose the hollow tube.

The diffusing particles contained in the diffusing liquid are preferably particles having a refractive index different from that of the diffusing liquid. This is because there is almost no diffusing effect when the both have the same refractive index. Also, in order to increase the diffusing effect, it is effective to increase a difference of refractive indices between the diffusing liquid and the diffusing particles. Herein, a difference of 0.01 or more is sufficient as a difference of refractive indices. A difference of 0.03 or more is further preferable because the diffusing effect can be increased further.

In addition, diffusing particles having a uniform particle size are preferable as those contained in the diffusing liquid. By making the particle size uniform, it becomes possible to constantly stabilize the diffusion state, which can in turn enhance the image quality. It is therefore necessary to suppress a variance in particle size to about 10% or less.

Further, by furnishing not only the diffusing particles but also the hollow tube itself with the diffusing capability, the diffusing effect can be enhanced further. In this case, it is possible to enhance the diffusing effect by mixing the diffusing particles into a tube forming the hollow tube or providing concavity and convexity inside the hollow tube.

In order to reduce power consumption, it is possible to adjust a flow rate of the diffusing liquid inside the hollow tube in association with a display image. This is because influences of speckle noises are proportional to the brightness of the screen and speckle noises sensed by the viewer in a dark place are reduced considerably. By utilizing the foregoing, it becomes possible to save energy. More specifically, by adjusting a rate at which the diffusing liquid is flown through the hollow tube in response to the brightness of the screen to be displayed, power driving the pump can be reduced.

Also, the magnitude of speckle noises varies from one light source to another. In a case where RGB light sources are used, speckle noises are noticeable with a green light source because of high visual sensitivity. Further, in a case where a light source using wavelength conversion is used for green, because coherence is high in comparison with a light source of a direct oscillation of a semiconductor laser, considerable speckle noises occur. In view of the foregoing, on a screen configured to adjust colors by a distribution of the RGB light sources, speckle noises become larger on a screen for which an output for green is larger. In order to prevent this inconvenience, it is necessary to increase the flow rate of the diffusing liquid when green light is intense. More specifically, by adjusting the flow rate of the diffusing liquid in response to the hue on the screen, low power consumption can be achieved.

In this embodiment, the micro pump is used as the mechanism that puts the diffusing liquid in motion. However, besides the micro pump, normal pumps can be used as well. Also, the liquid can be put in motion by thermal hydraulics caused by a temperature difference of the diffusing liquid. By disposing the diffusing liquid to be in contact with the laser light source directly or via a part of the heat sink provided in intimate contact with the laser light source, the temperature of the diffusing liquid rises, which gives rise to thermal hydraulics caused by a temperature difference. By exploiting this mechanism, it becomes possible to put the diffusing liquid in motion and hence to reduce speckle noises. Using thermal hydraulics can eliminate the need of a driving device to put the diffusing liquid in motion. Hence, low power consumption and a size reduction can be achieved. Further, using the diffusing liquid as a heat pipe, there can be achieved another advantage that the laser light source can be cooled at the same time.

Sixth Embodiment

A sixth embodiment of the invention will now be described. This embodiment will describe a configuration to wave-guide a laser beam inside a hollow tube containing a diffusing liquid. By using a diffusing liquid having a high refractive index with respect to a material of the hollow tube, it becomes possible to wave-guide a laser beam into the diffusing liquid. FIG. 23A and FIG. 23B are schematic views used to describe the configuration of a liquid crystal display device using a planar light source according to a sixth embodiment of the invention. FIG. 23A is a top view and FIG. 23B is a side view. FIG. 23C is a cross section of the hollow tube of FIG. 23A and FIG. 23B.

A display portion 204 of this embodiment is formed of a liquid crystal panel unit 205 and a light guiding plate unit 207 disposed on the back side of the liquid crystal panel unit 205. The light conducting plate unit 207 encloses a diffusing portion formed of a hollow tube 203 filled with a diffusing liquid 206 and a micro pump 202. As is shown in FIG. 23C, the interior of the hollow tube 203 of the diffusing portion is filled with the diffusing liquid 206. By disposing the laser light source 201 on the end face of the hollow tube 203 and allowing a laser beam emitted from the laser light source 201 to enter from the end face of the hollow tube 203, the laser beam is wave-guided through the diffusing liquid 206. The laser beam is scattered at a scattering region 231 provided in a part of the hollow tube 203 and then wave-guided to the light guiding plate unit 207. By using the hollow tube 203 as a waveguide, it becomes possible to carry light to any desired place within the light guiding plate unit 207. Also, because a laser beam is diffused by the diffusing liquid 206 in the hollow tube 203 over a long distance, spatial coherence of the laser beam decreases significantly. Speckle noises can be thus reduced markedly.

Also, because a long length can be secured as an interaction length between a laser beam and the diffusing liquid 206, even when the density of diffusing particles in the diffusing liquid 206 is lowered, a satisfactory speckle noise reducing effect can be achieved. By lowering the diffusing particles density, flow resistance of the diffusing liquid becomes smaller. Accordingly, the micro pump 202 can be made compact, which in turn enables low power consumption.

The scattering region 231 is formed of periodical protrusion portions or a rough source provided inside or on the inner surface of the hollow tube 203 and has a light scattering effect.

In a case where pure water is used as the diffusing liquid 206, the refractive index of the diffusing liquid is about 1.44. Then, $MgF_2$, $HfF_4$, and LiF are available as a material of the hollow tube 203. The refractive index of these materials is about 1.4 or less, which is lower than the refractive index of water. Hence, it becomes possible to wave-guide light by trapping the light in the diffusing liquid owing to a difference of refractive indices. Besides making the hollow tube 203 itself out of $MgF_2$, $HfF_4$, and LiF, the same effect can be achieved by depositing a film of $MgF_2$, $HfF_4$, and LiF inside the hollow tube 203.

In a case where materials other than pure water are used as the diffusing liquid 206, there is a method of using a liquid having a high refractive index as the diffusing liquid. Some types of organic oil have a high refractive index exceeding 1.6, and a sufficiently large refractive index difference can be achieved even when $SiO_2$ is used as the hollow tube. Light can be therefore trapped in the diffusing liquid 206. In a case where a liquid having a high refractive index is used, a flexible organic material can be used as the hollow tube 203. Hence, there can be achieved an advantage that the degree of freedom for the layout of the hollow tube 203 is increased.

FIG. 24A and FIG. 24B are schematic views used to describe another configuration of the display liquid crystal device using the planar light source according to the sixth embodiment of the invention. FIG. 24A is a top view and FIG. 24B is a side view. FIG. 24C is a cross section of a hollow tube of FIG. 24A and FIG. 24B. As are shown in FIG. 24A through FIG. 24C, the hollow tube 203 that guides a laser beam is disposed two-dimensionally on the back side of or inside the light guiding plate unit 207, so that the laser beam is wave-guided to the hollow tube 203. At the same time, the scattering region is provided to a part of the side face of the hollow tube 203 so that light is scattered from the side face. Planar illumination light can be thus achieved. By putting the diffusing liquid 206 in motion, the diffusion state of a laser beam is varied timewise, which can in turn reduce speckle noises markedly. As is shown in FIG. 24C, a structure in which the side face of the hollow tube 203 is covered with a reflection layer 221 in portions other than a portion through which a laser beam is wave-guided to the light guiding plate unit 207 is preferable. By preventing scattering to unwanted portions, the utilization efficiency of a laser beam can be increased.

Figure 25A:
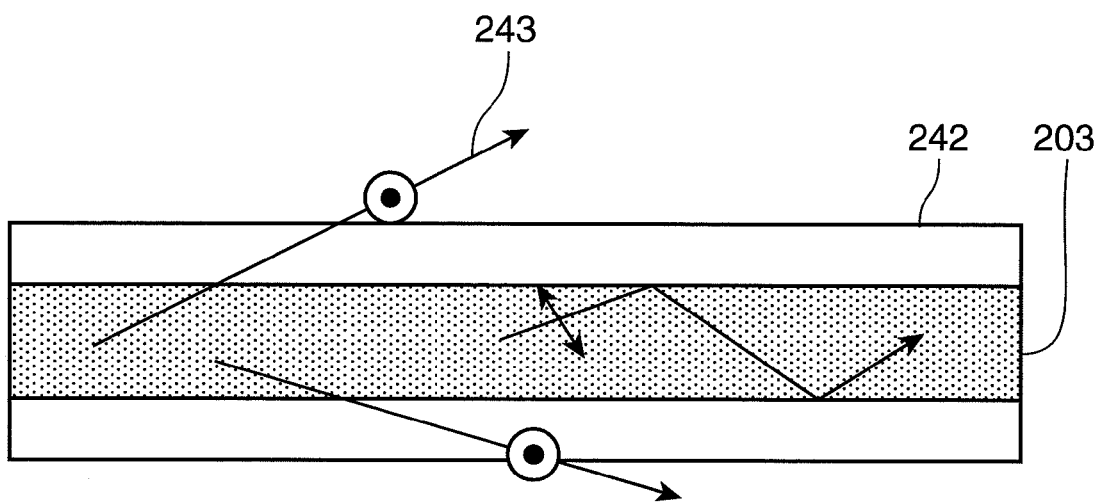
FIG. 25A and FIG. 25B are schematic views used to describe the configuration using a photonic crystal structure for a hollow tube 203.
Figure 25B:
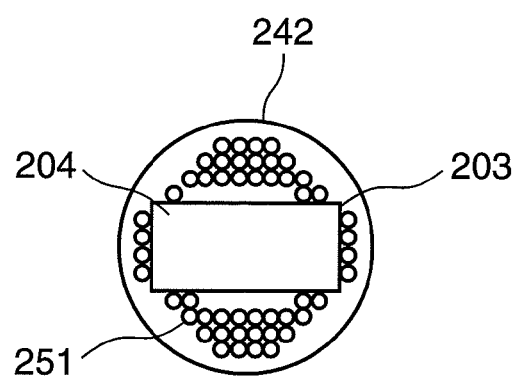

A configuration using a photonic crystal structure in the hollow tube 203 is also possible. FIG. 25A and FIG. 25B are schematic views used to describe the configuration using the photonic crystal structure in the hollow tube 203. FIG. 25A is a side view and FIG. 25B is a cross section. As are shown in FIG. 25A and FIG. 25B, by providing the hollow tube 203 inside a fiber 242 having photonic crystals 251 and formed of a microscopic hollow structure, it becomes possible to scatter a laser beam 243 by selecting the wavelength and polarization. Consequently, utilization efficiency of light to be emitted is increased, which in turn enables low power consumption.

In a case where a laser beam is wave-guided to the diffusing liquid of the fifth and sixth embodiments, the mechanism that emits wave-guided light to the side face of the hollow tube is necessary. For example, by adding a capability of diffusing a laser beam to a predetermined place of the hollow tube, a laser beam can be emitted to the side face wherever necessary. Examples of the side face emitting capability of the hollow tube include a method of mixing diffusing particles into a material of the hollow tube and a method of providing concavity and convexity inside the hollow tube. Also, by increasing the refractive index of particles contained in the diffusing liquid to be equal to or higher than that of the hollow tube, side face emission can be achieved as the particles come into contact with the side face of the hollow tube.

The liquid crystal display device of the fifth and sixth embodiments use a liquid of diffusing liquid as the diffusing portion that diffuses a laser beam in a liquid crystal display device in which a laser beam is illuminated from the laser light source to the liquid crystal panel unit and the planar light guiding plate unit. By varying the diffusion state of a laser beam timewise with flow motion of the diffusing liquid, speckle noises can be reduced. By exploiting flow motion of the diffusing liquid, a volume of the diffusing portion can be reduced markedly. A reduction in size and low power consumption are thus enabled. Further, by exploiting flow motion of the diffusing liquid for heat release, thermal resistance of the laser light source can be reduced markedly, which makes it possible to enhance both reliability and luminous efficiency of the laser light source. Also, by spreading the heat release portion exploiting the flow motion of the diffusing liquid over the entire liquid crystal panel unit, the optical system can be readily reduced in size and in thickness, which makes it possible to achieve an extremely thin and light liquid crystal display device. The liquid crystal display devices of the fifth and sixth embodiments are therefore effective as a large screen liquid crystal display device.

Seventh Embodiment

A seventh embodiment of the invention will now be described. FIG. 26A and FIG. 26B are schematic views used to describe the configuration of a liquid crystal display device according to a seventh embodiment of the invention. FIG. 26A is a top view and FIG. 26B is a side view.

In the liquid crystal display device of this embodiment, light emitted from a laser light source 301 passes through a hollow tube 361 filled with diffusing particles 363 and then is guided to a connection portion 302. The connection portion 302 diffuses the laser beam to guide light to first and second light guiding plate units 307 and 308. The first and second light guiding plate units 307 and 308 then serve as a planar illumination light source and supply light to first and second liquid crystal panel units 305 and 306.

A liquid containing the diffusing particles 363 and filling the hollow tube 361 is circulated through the hollow tube 361 by a micro pump 362. The first and second liquid crystal panel units 305 and 306 enable a display of a moving image by adjusting transmittance of liquid crystals according to the image information. The laser light source 301 has a characteristic of being compact and achieving high efficiency. However, it generates coherent speckle noises due to high coherence. In order to prevent this inconvenience, a liquid containing the diffusing particles 363 is forced to move inside the hollow tube 361 by the micro pump 362 so that the diffusion state of a laser beam traversing the hollow tube 361 is varied timewise. Spatial coherence can be thus reduced, which can in turn prevent speckle noises.

Further, by using the liquid passing inside the hollow tube 361 as a heat sink of the laser light source 301, it becomes possible to release heat generated by the laser using a wide area of the first and second light guiding plate units 307 and 308. By releasing heat using a wide area of the first and second light guiding plate units 307 and 308 by bringing the liquid into contact with the laser light source 301 either directly or indirectly so that heat is absorbed, a compact and efficient heat releasing mechanism can be achieved. Because heat generation in the laser light source 301 deteriorates luminous efficiency markedly, it becomes possible to enhance heat generation efficiency significantly by the liquid.

In this embodiment, the liquid is forcedly moved using the micro pump 362. It is, however, also possible to use a diffusion flux by which a liquid moves due to thermal diffusion caused by a temperature difference of the liquid resulting from heat generation in the laser light source 301. Also, it is possible to realize a low power consuming system by using both the micro pump and the diffusion flux.

FIG. 27A and FIG. 27B are schematic views used to describe another configuration of the liquid crystal display device according to the seventh embodiment of the invention. FIG. 27A is a top view and FIG. 27B is a side view. As are shown in FIG. 27A and FIG. 27B, a configuration to waveguide a laser beam from a laser light source 301 to the inside of a liquid containing diffusing particles 363 and moving inside a hollow tube 361 is also possible. In this case, the liquid sent out by a micro pump 362 passes inside the hollow tube 361 and flows through the connection portion 302 to return again to the micro pump 362. Light from the laser light source 301 goes into the hollow tube 361 that runs inside the connection portion 302. It is then diffused to first and second light guiding plate units 307 and 308 while propagating through the hollow tube 361 inside the connection portion 302. The hollow tube 361 thus plays two roles of propagating light and diffusing light. Because the diffusing particles 363 passing inside the hollow tube 361 vary timewise, so does the diffusion state, which can in turn reduce speckle noises. In this case, by setting the refractive index of the liquid inside the hollow tube 361 to a value larger than that of the refractive index of the hollow tube 361, more light is trapped. It thus becomes possible to propagate light over a relatively long distance.

Figures 28A, 28B:
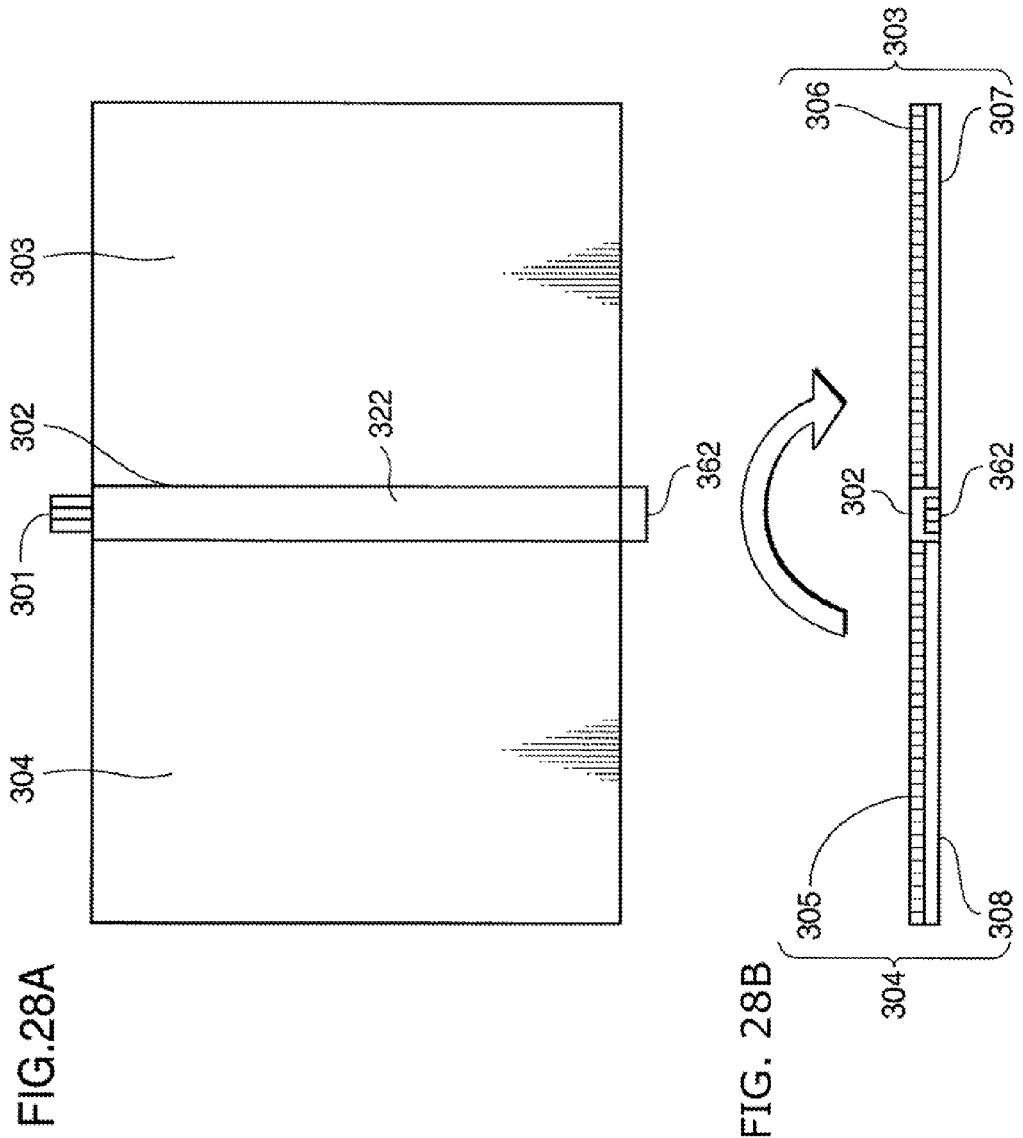
FIG. 28A and FIG. 28B are schematic views used to describe still another configuration of the liquid crystal display device according to the seventh embodiment of the invention.

FIG. 28A and FIG. 28B are schematic views used to describe still another configuration of the liquid crystal display device according to the seventh embodiment of the invention. FIG. 28A is a top vie and FIG. 28B is a side view. As are shown in FIG. 28A and FIG. 28B, this configuration uses micro bubbles made of fine bubbles as a method of diffusing light at a connection portion 302. The connection portion 302 is filled with a liquid and micro bubbles 322 of the order of microns are generated at the connection portion 302 by a micro pump 362. The micro bubbles 322 diffuse a laser beam coming from the laser light source 301 and entering into the connection portion 302. At the same time, because the diffusion state by the micro bubbles 322 varies timewise, coherence of the laser is reduced, which makes it possible to suppress speckle noises. Accordingly, a laser beam can be diffused with a simple configuration and speckle noises can be reduced. This configuration is therefore effective for a reduction in size.

Figure 29A:
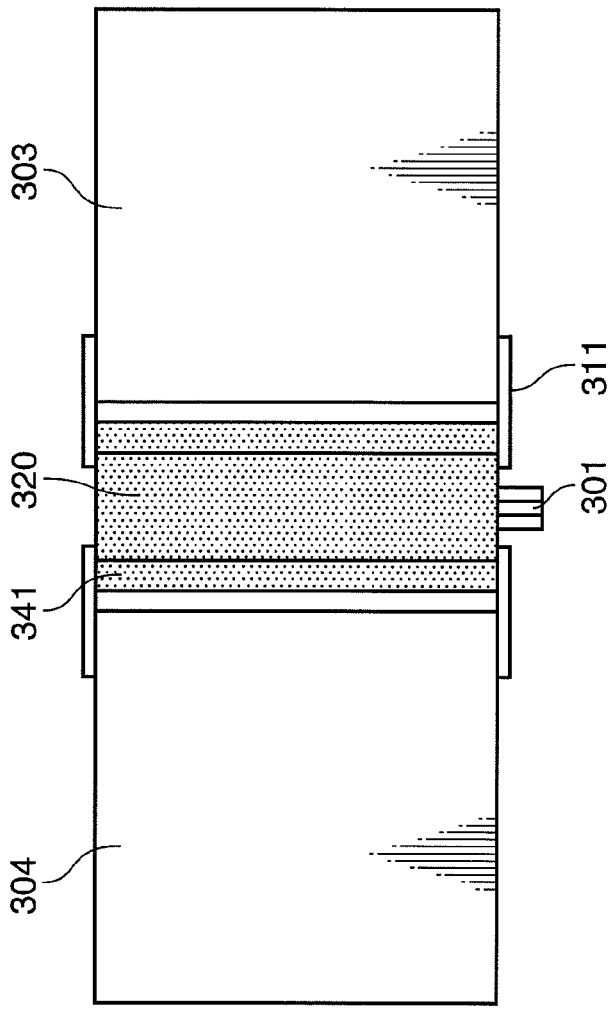
FIG. 29A and FIG. 29B are schematic views used to describe still another configuration of the liquid crystal display device according to the seventh embodiment of the invention.
Figure 29B:
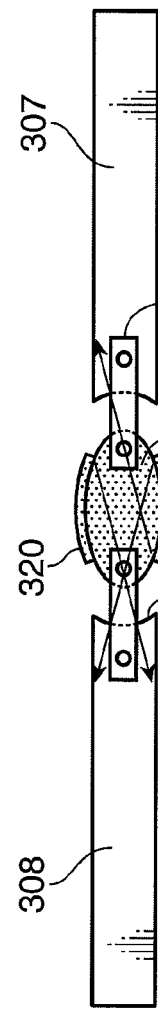
Figure 29C:
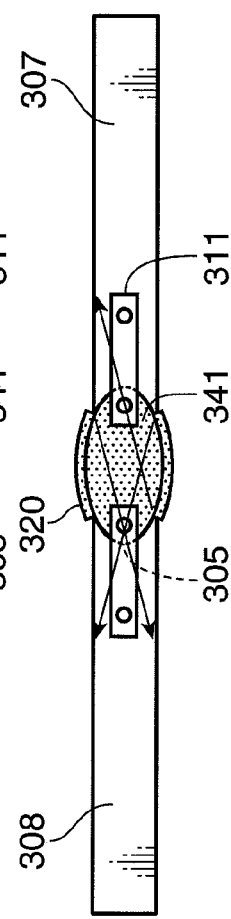

FIG. 29A and FIG. 29B are schematic views used to describe still another configuration of the liquid crystal display device according to the seventh embodiment of the invention. FIG. 29A is a top view and FIG. 29B and FIG. 29C are side views. As are shown in FIG. 29A through FIG. 29C, in this configuration, a laser beam propagating through the connection portion is propagated to first and second light guiding plate units 307 and 308 efficiently. The connection portion is furnished with the hinge capability. Hence, when the first and second display portions 303 and 304 are opened, the device is in a double spread state as is shown in FIG. 29B. As is shown in FIG. 29C, the end faces of the respective first and second light guiding plate units 307 and 308 come in contact with a light guiding rod 341 present inside the connection portion. The light incident portion of the light guiding rod 341 with which each of the first and second light guiding plate units 307 and 308 comes into contact is made of a variable material, for example, soft plastic, whose shape is changed when pressed against by the first and second light guiding plate units 307 and 308. When being pressed against, it comes into intimate contact with light incidence portions 305 of the respective first and second light guiding plate units 307 and 308. There is no optical boundary portion in the intimately contacting portion and light propagates with a small loss, whereas light is reflected on portions not in intimate contact. Accordingly, light is supplied to the first and second light guiding plate units 307 and 308 in the intimately contacting portion alone. A propagation loss at the connection portion can be thus reduced markedly.

Further, by selecting a material having a refractive index lower or equal to the refractive index of the first and second light guiding plate units 307 and 308 for the light guiding rod 341, a laser beam propagating through the light guiding rod 341 is guided to the first and second light guiding plate units 307 and 308 without generating a loss at the connection portion. By forming a reflection film 320 on the light guiding rod 341 in a portion that does not come into contact with the first and second light guiding plate units 307 and 308, it becomes possible to further prevent light from leaking to other portions. Utilization efficiency of light can be thus enhanced significantly.

A laser light source has a luminous point of a small area and high luminance, and is therefore able to allow a laser beam to go incident on a narrow light guiding rod of the order of about 100 µm without a loss of light. Hence, it becomes possible to diffuse a laser beam to the display portion efficiently in a compact display device. A high efficient light distributing system required for a reduction in size can be thus achieved. It is configured in such a manner that the light guiding rod 341 is pinched by the light guiding plate units 307 and 308 when they are opened and is thereby configured in such a manner that the light guiding plate units 307 and 308 come into contact with the light guiding rod 341. By using a variable material for the light guiding rod in a portion coming into contact with the light guiding plate units, the light guiding rod undergoes deformation and comes into intimate contact with the light guiding plate units. Accordingly, light propagating through the light guiding rod 341 can be propagated to the light guiding plate units efficiently.

FIG. 30A and FIG. 30B are schematic views used to describe still another configuration of the liquid crystal display device according to the seventh embodiment of the invention. FIG. 30A is a top view and FIG. 30B is a side view. This configuration is a configuration in which a light guiding rod 351 is pinched by first and second light guiding plate units 307 and 308 when they are opened, and is thereby configured in such a manner that the light guiding rod 351 comes into contact with light incident portions 305 of the respective first and second light guiding plate units 307 and 308. By using a variable material for the light guiding rod 351 in a portion that comes into contact with the light incident portions 305 of the respective first and second light guiding plate units 307 and 308, the light guiding rod 351 undergoes deformation and comes into intimate contact with the first and second light guiding plate units 307 and 308. It thus becomes possible to propagate light propagating through the light guiding rod 351 to the first and second light guiding plate units 307 and 308 efficiently.

Further, by forming the end portions of the respective first and second light guiding plate units 307 and 308 in the shape of a wedge, the connection portion between the first and second light guiding plate units 307 and 308 can be made extremely small and unnoticeable when the first and second light guiding plate units 307 and 308 are opened. Hence, an image displayed on first and second display portions 303 and 304 can be displayed as a large image having no joint.

Figure 31A:
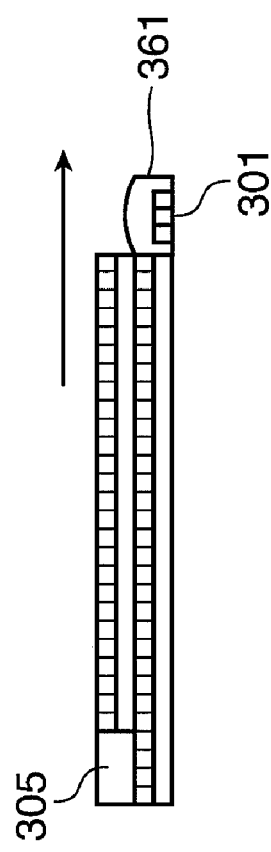
FIG. 31A and FIG. 31B are schematic views used to describe a configuration of the liquid crystal display device according to the seventh embodiment of the invention.
Figure 31B:
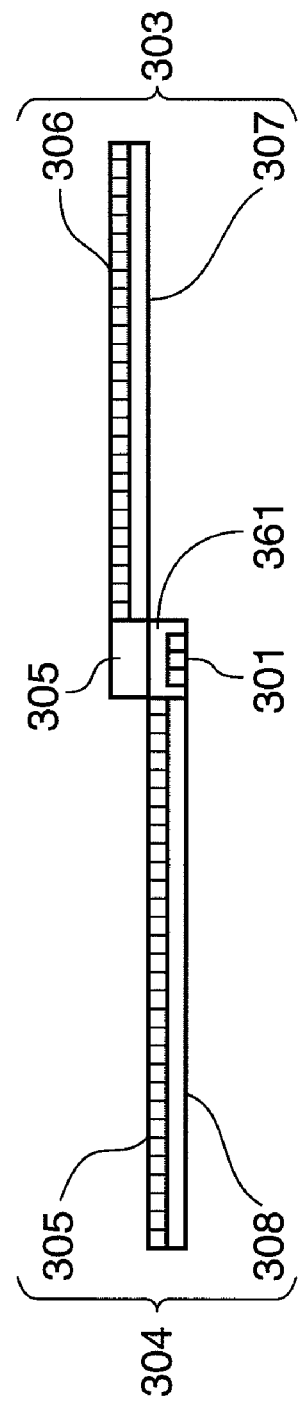

FIG. 31A and FIG. 31B are schematic views used to describe still another configuration of the liquid crystal display device according to the seventh embodiment of the invention. FIG. 31A is a side view before the liquid crystal display panel unit is slid (when accommodated) and FIG. 31B is a side view after the liquid crystal display panel unit is slid (when expanded). In this configuration, light is propagated using a variable light guiding rod in a slide type liquid crystal display device. As are shown in FIG. 31A and FIG. 31B, a light incidence portion 305 and a light guiding rod 361 forming the connection portion are brought into contact with each other by sliding first and second display portions 303 and 304 in mutually different directions. Light from the laser light source 301 goes into the light guiding rod 361. The light guiding rod 361 is made of a variable material and comes into contact with the light incident portion 305 by the sliding of the first and second display portions 303 and 304. The light guiding rod 361 undergoes deformation upon contact and comes into intimate contact with the light incident portion 305. Because there will be no optical boundary in the intimate contact state, light propagating through the light guiding rod 361 is diffused to the light incident portion 305 without generating a loss. Because the light incident portion 305 is also furnished with the diffusing capability, diffused light illuminates the first and second liquid crystal panel units 305 and 306 from the back side via first and second light guiding plate units 307 and 308. Consequently, an optical loss between the light guiding rod 361 and the light incident portion 305 can be reduced markedly.

In this embodiment, the light diffusing and guiding rod of a column shape containing diffusing particles is used as the connection portion. However, a photonic crystal formed of a periodical structure of the order of nanometers can be used as well. When a photonic crystal of a periodical structure smaller than the order of the light wavelength is used, it becomes possible to separate a polarization of light. Hence, light diffused from the connection portion can be limited to particular polarization. The liquid crystal panel unit can increase the utilization efficiency of light by using light of single polarization. Hence, by aligning polarization of light diffused from the connection portion using the photonic crystal, it becomes possible to enhance the utilization efficiency of a laser beam passing through the liquid crystal panel unit.

From the respective embodiments above, the invention can be summarized as follows. That is, a liquid crystal display device according to one aspect of the invention includes: a plurality of display portions each having a liquid crystal display panel unit having one principal surface on which a laser beam goes incident and the other principal surface opposing the one principal surface and a planar light guiding plate unit disposed on a side of the one principal surface of the liquid crystal display panel unit; a connection portion connected to each of the plurality of display portions so as to dispose the plurality of display portions for images displayed on the plurality of respective display portions to be displayed adjacently; and a laser light source supplying the laser beam to the light guiding plate unit. The laser light source emits the laser beam to the connection portion, and the connection portion supplies the laser beam emitted from the laser light source to the light guiding plate unit in each of the plurality of display portions.

The liquid crystal display device described above is able to supply light from the laser light source to the planar light guiding plate unit efficiently owing to the structure to supply light to a plurality of liquid crystal display panel units via the connection portion. By supplying a laser beam via the connection portion, the number of laser light sources and optical systems can be reduced, which in turn enables a reduction in size and in cost. Further, by using the laser light source, the luminance of the light source can be increased, which allows light to enter into and exit from fine optical systems and optical components efficiently. It thus becomes possible to reduce the optical systems including the light source and the connection portion in size and make the light guiding plate unit thinner. Further, by providing the laser light source to the connection portion that is in a portion connecting the liquid crystal display panel units, the laser light source can be connected to a plurality of liquid crystal display panel units thermally via the connection portion, so that a plurality of liquid crystal display panel units can be used as heat releasing plates. Accordingly, the heat releasing effect on the laser light source can be increased and heat can be sufficiently released from the laser light source even in a compact display device. It thus becomes possible to achieve enhancement of reliability and enhancement of luminous efficiency of the light source.

It is preferable that the connection portion has a hinge mechanism that couples the plurality of display portions in a state where the plurality of display portions are openable and closable using end portions of the plurality of display portions as a rotation shaft so that the plurality of display portions are allowed to change from a closed state to an opened state.

In this case, by having the hinge mechanism, the connection portion allows a plurality of liquid crystal display panel units connected to each other via the connection portion to open and close. The size can be therefore reduced markedly and the liquid crystal display device can be carried along easily.

It is preferable that the plurality of display portions include a first display portion and a second display portion; the first display portion has a first liquid crystal display panel unit and a first light guiding plate unit; the second display portion has a second liquid crystal display panel unit and a second light guiding plate unit; the connection portion has a slide mechanism that couples the first and second display portions in a state where one of the first and second display portions is slidable so that the first and second display portions are allowed to change from a closed state to an opened state; the first light guiding plate unit is constantly in contact with the connection portion; the second light guiding plate unit has a light incident portion on which the laser beam goes incident; and the connection portion comes into contact with the light incident portion of the second light guiding plate unit by sliding the second display portion and supplies the laser beam to the second light guiding plate unit through the light incident portion.

In this case, by sliding the display portion, the liquid crystal display device can be reduced markedly in size and can be therefore carried along easily. By sliding the display portion, the display area is expanded. Also, by sliding the display portion, the connection portion and the second liquid crystal display panel unit are connected to each other, which enables an image display. The sliding can also serve as the switching to enable a display on a plurality of screens.

It is preferable that the connection portion further has one end face from which the laser beam enters inside, the other end face opposing the one end face, and a waveguide tube diffusing the laser beam entering from the one end face toward the light guiding plate unit in each of the plurality of display portions while wave-guiding the laser beam toward the other end face.

In this case, by providing the waveguide tube to the connection portion and by supplying the scattering from the side face of the hollow tube to the light guiding plate unit disposed on the back side of the liquid crystal display panel unit, it becomes possible to supply a laser beam to the light guiding plate from a compact optical system. A compact configuration can be thus achieved.

It is preferable that the waveguide tube has a reflection layer disposed on an outer peripheral surface of the waveguide tube in a surface other than a surface through which the laser beam to be diffused toward the light guiding plate unit in each of the plurality of display portions passes.

In this case, the waveguide tube provided with the reflection film on the portions other than a portion through which a laser beam is supplied to the light guiding plate unit becomes able to prevent a laser beam from leaking to portions other than the light guiding plate unit. Accordingly, a laser beam can be supplied to the light guiding plate more efficiently, which enables low power consumption.

It is preferable that the connection portion further has one end face from which the laser beam enters inside, the other end face opposing the one end face, and an optical interconnection outputting the laser beam entering from the one end face toward the light guiding plate unit in each of the plurality of display portions while propagating the laser beam toward the other end face, and that the optical interconnection has a plurality of output portions each outputting the laser beam while diffusing the laser beam toward the light guiding plate unit in each of the plurality of display portions.

In this case, by supplying a laser beam to the light guiding plate unit using the optical interconnection, a volume of the connection portion can be reduced markedly. Because the laser light source has high luminance, it is able to couple light to an optical interconnection or an optical fiber of the order of several tens μm without any loss. By supplying a laser beam to the light guiding plate unit using these optical interconnections, the volume of the connection portion can be reduced markedly and the overall device can be compact.

It is preferable to further include an optical interconnection disposed between the laser light source and the connection portion and propagating the laser beam emitted from the laser light source to the connection portion.

In this case, by supplying a laser beam to the connection portion via the optical interconnection, the degree of freedom for the layout of the laser can be increased, which facilitates the overall design.

It is preferable that the optical interconnection has a plurality of emission portions each disposed at a different position and emitting the laser beam emitted from the laser light source to the connection portion, and that the connection portion has a plurality of light incident portions corresponding the plurality of emission portions in a one-to-one correspondence and on each of which the laser beam emitted from the corresponding emission portion goes incident.

In this case, it is necessary to distribute light homogeneously in the connection portion when a laser beam is supplied to the light guiding plate unit from the connection portion. By dividing a portion that supplies a laser beam into a plurality portions and supplying the laser beam to the connection portion, the distribution of a laser beam in the connection portion can be readily made homogeneous.

It is preferable that the laser light source includes a plurality of laser light sources that correspond to the plurality of emission portions in a one-to-one correspondence, and that the plurality of laser light sources are disposed apart from one another.

In this case, even when RGB light sources for full-color are used or a plurality of light sources are used to increase luminance as the laser light source, it becomes possible to improve the heat releasing characteristic of the respective laser beams significantly by disposing these light sources apart from one another. Because the laser has an extremely small loss, even when the optical interconnection is used, light can be utilized efficiently and the heat releasing effect can be increased by using the laser. The light source can therefore achieve an extended life and a higher output.

It is preferable that: the laser light source includes a plurality of laser light sources; the connection portion has a plurality of light incident portions on which laser beams emitted from the plurality of laser light sources go incident; and at least one of the plurality of laser light sources emits a laser beam to a light incident portion different from light incident portions on which laser beams from a rest of the plurality of laser light sources go incident.

In this case, in a case where a plurality of laser beams are disposed to the connection portion, the laser light sources can be disposed apart from one another by allowing light to enter from a plurality of light incident portions. It thus becomes possible to enhance the reliability of the light source and to achieve a higher output by improving the heat releasing characteristic of the laser light source.

It is preferable to further include a luminometer disposed in a vicinity of a surface of the liquid crystal display panel unit and measuring luminance of outside light illuminating the liquid crystal display panel unit and a light amount control circuit controlling a light amount of the laser light source, so that the light amount control circuit increases and decreases the light amount of the laser light source on the basis of a measurement result by the luminometer.

In this case, even when the liquid crystal display device is used as a mobile display device in places at different brightness, by adjusting the luminance of the screen in response to the outside brightness, the screen becomes easy to see. In this instance, by changing the luminance of the screen by modulating the intensity of a laser beam, power consumption of the light source can be suppressed. Also, even when RGB laser light sources are used, by adjusting the brightness of the respective RGB laser light sources separately in response to the outside brightness and colors of outside illumination light, it becomes possible to express natural colors without being affected by outside illumination.

It is preferable to further include a display control circuit controlling an image display by the liquid crystal display panel unit according to image information representing an image to be displayed on the liquid crystal display panel unit, so that the light amount control circuit increases and decreases the light amount of the laser light source on the basis of the measurement result by the luminometer and the image information.

In this case, by adjusting the luminance of the screen in response to an image to be displayed on the liquid crystal display panel unit, the screen becomes easy to see. In this instance, by changing the luminance of the screen by modulating the intensity of a laser beam, it becomes possible to suppress power consumption of the light source.

It is preferable that the connection portion has an optical switch making a switching action to enable and disable a supply of the laser beam emitted from the laser light source to the light guiding plate unit in each of the plurality of display portions, and an optical switch control circuit controlling the switching action by the switch, so that when the display control circuit selectively performs an image display by the plurality of liquid crystal display panel units according to the image information, the optical switch control circuit specifies a liquid crystal display panel unit that is not selected by the display control circuit for the image display according to the image information and interrupts a supply of the laser beam through the switch action by the optical switch for the liquid crystal display panel unit that has been specified.

In this case, it becomes possible to turn off illumination selectively for a liquid crystal display panel unit on which a display is unnecessary. Alternatively, by controlling a laser light amount to be supplied to each liquid crystal display panel unit by the light amount control circuit, the brightness across the entire multi-panel can be made homogeneous, or the display screen can be brighter by increasing the luminance for a particular liquid crystal display panel unit alone or darker by conversely lowering the luminance. In a case where illumination is turned off selectively or in a case where a laser light amount is controlled as has been described above, it is possible to perform control according to a signal from the display control circuit.

It is preferable to further include a diffusing portion diffusing the laser beam emitted from the laser light source, and it is preferable that the diffusing portion includes a hollow tube and a diffusing liquid made of a liquid containing diffusing particles and that the diffusing liquid is in motion inside the hollow tube.

In this case, it becomes possible to vary the diffusion state of the diffusing portion timewise. By varying the diffusion state of a laser beam passing through the diffusing portion timewise, speckle noises can be reduced.

It is preferable that the diffusing portion is routed two-dimensionally and disposed on a plane almost parallel to the one principal surface of the light guiding plate unit, and that the laser beam passes through the diffusing portion at more than one point of the diffusing portion.

In this case, by allowing a laser beam to pass through the diffusing portion more than once, the diffusing effect can be increased and speckle noises can be reduced further. Also, by disposing the diffusing portion two-dimensionally, there can be achieved an effect that space saving can be achieved.

It is preferable that the diffusing portion is disposed inside the light guiding plate unit.

In this case, a laser beam wave-guided through the light guiding plate unit is diffused by passing through the diffusing portion, which can in turn reduce speckle noises.

It is preferable that the hollow tube is a bundle of a plurality of hollow tubes.

In this case, a laser beam passes through a large number of diffusing portions, which can in turn increase the speckle suppressing effect.

It is preferable that the laser light source is disposed in a vicinity of a part of the hollow tube.

In this case, heat generated in the laser light source can be carried to the entire liquid crystal display panel by the diffusing liquid, which makes it possible to release heat from the laser light source using a wide liquid crystal display surface. Accordingly, because the cooling effect on the laser light source can be enhanced significantly, enhancement of reliability and enhancement of luminous efficiency of the laser light source can be achieved.

It is preferable that the hollow tube puts the diffusing liquid in motion by thermal hydraulics caused by heat generation in the laser light source.

In this case, the need for the mechanism to put the diffusing liquid in motion, such as a pump, can be eliminated. The configuration of the diffusing portion can be therefore simpler.

It is preferable that the connection portion has variability in shape and a contact portion that directly comes into contact with the light guiding plate unit and thereby supplies the laser beam to the light guiding plate unit by brining the contact portion and the light guiding plate unit into direct contact with each other.

In this case, it becomes possible to supply a laser beam from the connection portion to the light guiding plate unit efficiently.

It is preferable that a refractive index of the connection portion is equal to a refractive index of the light guiding plate unit or less.

In this case, a laser beam lead through the connection portion can be supplied to the light guiding plate unit at a small loss.

It is preferable that the laser light source is a laser light source emitting at least three colors of light including red, blue, and green.

In this case, a full-color display is enabled by the RGB laser light sources.

A planar light source according to another aspect of the invention includes a laser light source portion supplying a laser beam for illumination to a planar light guiding plate unit and a diffusing portion diffusing the laser beam. The diffusing portion includes a hollow tube and a diffusing liquid made of a liquid that contains diffusing particles. The diffusing liquid is in motion inside the hollow tube.

The planar light source is able to vary a diffusion state of the diffusing portion timewise. By varying the diffusion state of a laser beam passing through the diffusing portion timewise with the configuration of the invention, it becomes possible to reduce speckle noises. By using a compact micro pump and a hollow tube, an extremely compact speckle noise removing mechanism can be achieved. It thus becomes possible to achieve a thin liquid crystal display device. Also, a drive mechanism for reducing speckle noises can be more silent by using flow motion of the liquid and the pump. It thus becomes possible to achieve an extremely silent configuration.

It is preferable that the planar light guiding plate unit includes a tabular principal surface light incident type light guiding plate guiding the laser beam from one principal surface and a diffusing portion routed two-dimensionally and disposed inside or on a periphery of the principal surface light incident type light guiding plate, and that the laser beam passes through the diffusing portion at more than one point.

In this case, in a configuration in which a laser beam is diffused by the diffusing portion formed of the hollow tube filled with the diffusing liquid, by disposing the diffusing portion two-dimensionally for a laser beam to pass through the diffusing portion more than once, it becomes possible to enhance the diffusing effect, which can in turn reduce more speckle noises. In addition, by disposing the diffusing portion two-dimensionally, there can be provided an effect that space saving can be achieved.

It is preferable that the planar light guiding plate unit includes a tabular principal surface light incident light guiding plate guiding the laser beam from one principal surface and a diffusing portion routed two-dimensionally and disposed in intimate contact with the other principal surface of the principal surface light incident light guiding plate and propagating the laser beam entering from one end portion to the other end portion while guiding the laser beam into the principal surface light incident guiding plate from the other principal surface of the principal surface light incident light guiding plate.

In this case, by disposing the diffusing portion that guides the laser beam two-dimensionally and wave-guiding the laser beam to be guided to the inside of the diffusing portion to the light guiding plate, it becomes possible to guide the laser beam homogeneously to the light guiding plate. At the same time, by propagating the laser beam through the diffusing portion, the laser beam passes through the diffusing liquid over a longer distance, which makes it possible to reduce speckle noises further. In addition, because the laser beam can be carried to any desired place by the diffusing portion, this configuration is effective for a reduction in size.

It is preferable that the diffusing portion is formed inside the planar light guiding plate unit, so that the laser beam propagating trough the light guiding plate unit passes through the diffusing portion.

In this case, a laser beam wave-guided through the light guiding plate is diffused by passing through the diffusing portion, which makes it possible to reduce speckle noises.

It is preferable that the diffusing portion is formed of a bundle of a plurality of hollow tubes so that the laser beam traverses the diffusing portion.

In this case, a laser beam passes through a large number of diffusing portions, which can enhance the speckle suppressing effect.

It is preferable that the laser light source portion is in contact with the diffusing liquid directly or via a heat sink.

In this case, it becomes possible to carry heat generated in the laser light source portion to the entire liquid crystal display panel by the diffusing liquid. Accordingly, heat can be released from the laser light source portion using a wide liquid crystal display surface. Because the cooling effect on the laser light source portion can be enhanced markedly, enhancement of reliability and enhancement of luminous efficiency of the laser light source can be achieved.

It is preferable to further include the second light guiding plate unit and a reflection portion on an end face of the second light guiding plate unit, and it is preferable that a laser beam diffused by the light guiding plate is reflected on the reflection portion and then guided to the second light guiding plate unit so that the laser beam is emitted from a surface of the second light guiding plate unit.

In this case, it becomes possible to illuminate the liquid crystal panel by making the laser light source that has been made homogenous by the light guiding plate into a planar light source using the second light guiding plate. Hence, illumination light can be made homogenous using a compact structure using a light guiding plate of a reduced area.

It is preferable that a refractive index of the diffusing liquid is higher than a refractive index of the hollow tube.

In this case, it becomes possible to trap light within the diffusing liquid inside the hollow tube using a difference of refractive indices. By propagating a laser beam through the diffusing liquid, it becomes possible to propagate light using the diffusing portion. Also, by propagating light through the diffusing liquid over a long distance, speckle noises of the laser beam can be reduced markedly.

It is preferable to have a diffusing region formed of a grating or diffusing particles in at least a part of a surface or inside the hollow tube of the diffusing portion.

In this case, it becomes possible to emit light propagating through the diffusing liquid to a side face of the diffusing portion in the diffusing region. By wave-guiding the light emitted to the side surface to the light guiding plate, a planar, homogeneous light source can be achieved.

It is preferable that a particle size of the diffusing particles is in a range of sub μm to several μm and that the diffusing particles have an almost uniform particle size.

In this case, even when the diameter of the hollow tube is reduced, it becomes possible to put the diffusing liquid in motion in a stable manner by making the particle size of the diffusing particles smaller. However, in order to achieve the diffusing effect by the diffusing liquid, it is necessary for the diffusing particles to have a particle size of the order of a light wavelength or greater. A suitable particle size is therefore of the order of sub μm to several μm. Further, by making the particle sizes uniform, it becomes possible to achieve the homogenous speckle noise reducing effect by stabilizing a diffusion state.

It is preferable that a reflection film is provided to a side face of the light guiding plate.

In this case, the utilization efficiency of a laser beam can be enhanced by preventing leakage of the laser beam from the side face of the light guiding plate. Consequently, low power consumption is enabled.

It is preferable that the laser light source portion has a laser light source emitting at least three colors of light including red, blue, and green.

In this case, the liquid crystal display device is able to display a full color image.

It is preferable to further include a pump, so that the diffusing liquid in the hollow tube is put in motion by the pump.

In this case, by putting the diffusing liquid in motion by the pump, the speckle reducing effect can be enhanced by increasing the diffusion strength. Further, in a case where the diffusing liquid is used to release heat from the laser light source, heat resistance can be reduced by increasing a flow rate of the liquid, which can in turn enhance the heat releasing effect.

A liquid crystal display device according still another aspect of the invention further includes a liquid crystal display panel unit disposed in intimate contact with a surface side of the planar light source, so that a laser beam from the planar light source is converted into an image by the liquid crystal display panel unit.

By using the planar light source as a light source for the liquid crystal backlight, a laser light source excellent in color reproducibility becomes available and speckle noises are reduced further, which enables the liquid crystal display device to display a video at a high image quality. Further, because the mechanism for speckle noises can be made compact, there is an advantage that a thin liquid crystal display device can be fabricated. In addition, by putting the diffusing liquid in motion, the cooling effect can be obtained not only on the light source but also on the liquid crystal display panel unit itself. Hence, there is an advantage that the reliability of the liquid crystal display device can be enhanced.

Industrial Applicability

The liquid crystal display device of the invention includes a plurality of display portions each formed of a liquid crystal display panel unit and a planar light guiding plate unit and these display portions are connected by the connection portion, so that a laser beam is supplied to the planar light guiding plate unit via the connection portion from the laser light source provided to the connection portion. Hence, because a laser beam can be supplied from fewer laser light sources to a plurality of display portions, a reduction in size and low power consumption are enabled. Further, by folding the display panels by the connection portion, it becomes possible to achieve a display device compact enough to be portable. Because the laser light source has a small light-emitting area, the optical system can be readily reduced in size and in thickness. An extremely thin and light liquid crystal display device can be thus achieved. The liquid crystal display device of the invention is therefore effective as a portable large screen liquid crystal display device.

The invention claimed is:

1. A liquid crystal display device, comprising:
a plurality of display portions, each display portion of the plurality of display portions including (i) a liquid crystal display panel unit having one principal surface to which a laser beam is incident and another principal surface opposing the one principal surface and (ii) a planar light guiding plate unit disposed on a side of the one principal surface of the liquid crystal display panel unit;
a connection portion connected to each display portion of the plurality of display portions, such that the display portions of the plurality of display portions are arranged to display images adjacently thereon; and
a laser light source supplying the laser beam to the planar light guiding plate unit of each display portion of the plurality of display portions,
wherein the laser light source is positioned outside of the connection portion, is connected to an end face of the connection portion directly or via an optical interconnection, and emits the laser beam to the connection portion, and
wherein the connection portion supplies the laser beam emitted from the laser light source to the planar light guiding plate unit of each display portion of the plurality of display portions while diffusing the laser beam.

2. The liquid crystal display device according to claim 1, wherein the connection portion has a hinge mechanism that couples the display portions of the plurality of display portions, such that the display portions of the plurality of display portions are openable and closable using respective end portions thereof as a rotation shaft, and such that the display portions of the plurality of display portions are capable of changing from a closed state to an opened state.

3. The liquid crystal display device according to claim 1,
wherein the plurality of display portions include a first display portion and a second display portion,
wherein the first display portion has a first liquid crystal display panel unit and a first light guiding plate unit,
wherein the second display portion has a second liquid crystal display panel unit and a second light guiding plate unit,
wherein the connection portion has a slide mechanism that couples the first display portion and the second display portion, such that one of the first display portion and the second display portion is slidable so as to allow the first display portion and the second display portion to change from a closed state to an opened state,
wherein the first light guiding plate unit is constantly in contact with the connection portion,
wherein the second light guiding plate unit has a light incident portion to which the laser beam is incident, and
wherein the connection portion comes into contact with the light incident portion of the second light guiding plate unit by sliding the second display portion and supplies the laser beam to the second light guiding plate unit through the light incident portion.

4. The liquid crystal display device according to claim 1, wherein the connection portion further includes one end face from which the laser beam enters inside, another end face opposing the one end face, and a waveguide tube diffusing the laser beam entering from the one end face toward the planar light guiding plate unit in each display portion of the plurality of display portions while wave-guiding the laser beam toward the other end face.

5. The liquid crystal display device according to claim 4, wherein the waveguide tube includes a reflection layer disposed on an outer peripheral surface of the waveguide tube on a surface other than a surface through which the laser beam to be diffused toward the planar light guiding plate unit in each display portion of the plurality of display portions passes.

6. The liquid crystal display device according to claim 1,
wherein the connection portion further includes one end face from which the laser beam enters inside, another end face opposing the one end face, and an internal optical interconnection outputting the laser beam entering from the one end face toward the planar light guiding plate unit in each display portion of the plurality of display portions while propagating the laser beam toward the other end face, and
wherein the internal optical interconnection includes a plurality of output portions, each output portion of the plurality of output portions outputting the laser beam while diffusing the laser beam toward the planar light guiding plate unit in each display portion of the plurality of display portions.

7. The liquid crystal display device according to claim 1, wherein the optical interconnection is disposed between the laser light source and the connection portion and propagates the laser beam emitted from the laser light source to the connection portion.

8. The liquid crystal display device according to claim 7, wherein the optical interconnection includes a plurality of emission portions, each emission portion of the plurality of emission portions being disposed at a different position and emitting the laser beam emitted from the laser light source to the connection portion, and
wherein the connection portion includes a plurality of light incident portions, each light incident portion of the plurality of light incident portions corresponding, in a one-to-one manner, to each emission portion of the plurality of emission portions, such that the laser beam emitted from each corresponding emission portion is incident to each corresponding light incident portion.

9. The liquid crystal display device according to claim 8, wherein the laser light source includes a plurality of laser light sources, such that each laser light source of the plurality of laser light sources corresponds, in a one-to-one manner to each emission portion of the plurality of emission portions, and
wherein each laser light source of the plurality of laser light sources is disposed apart from one another.

10. The liquid crystal display device according to claim 1, wherein the laser light source includes a plurality of laser light sources,
wherein the connection portion includes a plurality of light incident portions to which laser beams emitted from the plurality of laser light sources are incident, and
wherein at least one laser light source of the plurality of laser light sources emits a laser beam to a light incident portion, of the plurality of light incident portions, which is different from other light incident portions of the plurality of light incident portions to which laser beams are incident.

11. The liquid crystal display device according to claim 1, further comprising:
a luminometer disposed in a vicinity of a surface of the liquid crystal display panel unit of a display portion of the plurality of display portions and measuring a luminance of outside light illuminating the liquid crystal display panel unit; and
a light amount control circuit controlling a light amount of the laser light source,
wherein the light amount control circuit increases and decreases the light amount of the laser light source based on a measurement result of the luminometer.

12. The liquid crystal display device according to claim 11, further comprising a display control circuit controlling an image display by the liquid crystal display panel unit according to image information representing an image to be displayed on the liquid crystal display panel unit,
wherein the light amount control circuit increases and decreases the light amount of the laser light source based on the measurement result of the luminometer and the image information.

13. The liquid crystal display device according to claim 12, wherein the connection portion comprises:
an optical switch performing a switching action to enable and disable a supply of the laser beam emitted from the laser light source to the planar light guiding plate unit in each display portion of the plurality of display portions; and
an optical switch control circuit controlling the switching action performed by the optical switch,
wherein, when the display control circuit selectively performs an image display via the plurality of liquid crystal display panel units according to the image information, the optical switch control circuit specifies a liquid crystal display panel unit, of the plurality of liquid crystal display panel units, that is not selected by the display control circuit for the image display according to the image information and interrupts a supply of the laser beam through the switching action performed by the optical switch for the specified liquid crystal display panel unit.

14. The liquid crystal display device according to claim 1, further comprising a diffusing portion diffusing the laser beam emitted from the laser light source,
wherein the diffusing portion includes a hollow tube and a diffusing liquid including a liquid containing diffusing particles, and
wherein the diffusing liquid is in motion inside the hollow tube.

15. The liquid crystal display device according to claim 14, wherein the diffusing portion is routed two-dimensionally and disposed on a plane almost parallel to the one principal surface of the planar light guiding plate unit of a display portion of the plurality of display portions, and
wherein the laser beam passes through the diffusing portion at more than one point of the diffusing portion.

16. The liquid crystal display device according to claim 14, wherein the diffusing portion is disposed inside the planar light guiding plate unit of a display portion of the plurality of display portions.

17. The liquid crystal display device according to claim 14, wherein the hollow tube is a bundle of a plurality of hollow tubes.

18. The liquid crystal display device according claim 14, wherein the laser light source is disposed in a vicinity of a part of the hollow tube.

19. The liquid crystal display device according to claim 14, wherein the hollow tube puts the diffusing liquid in motion using thermal hydraulics caused by heat generated by the laser light source.

20. The liquid crystal display device according to claim 1, wherein the laser light source emits at least three colors of light including red, blue, and green.

* * * * *